United States Patent [19]

Pagallo

[11] Patent Number: 5,544,262
[45] Date of Patent: Aug. 6, 1996

[54] METHOD AND APPARATUS FOR PROCESSING GRAPHICALLY INPUT EQUATIONS

[75] Inventor: Giulia Pagallo, Cupertino, Calif.

[73] Assignee: Apple Computer, Inc., Cupertino, Calif.

[21] Appl. No.: 932

[22] Filed: Jan. 5, 1993

Related U.S. Application Data

[63] Continuation-in-part of Ser. No. 864,607, Apr. 7, 1992, Pat. No. 5,317,647, Ser. No. 889,216, May 27, 1992, abandoned, and Ser. No. 1,123, Jan. 5, 1993.

[51] Int. Cl.$^6$ .................................................. G06K 9/72
[52] U.S. Cl. ..................... 382/189; 382/229; 364/419.08; 364/735
[58] Field of Search ................................... 382/13, 1, 69, 382/187, 189, 186; 395/161; 364/735, 736, 709.01, 705.03

[56] References Cited

U.S. PATENT DOCUMENTS

| | | | |
|---|---|---|---|
| 4,688,195 | 8/1987 | Thompson et al. | 364/300 |
| 4,845,652 | 7/1989 | Bunsen | 364/735 |
| 5,020,112 | 5/1991 | Chou | 382/39 |
| 5,083,268 | 1/1992 | Hemphill et al. | 395/12 |
| 5,157,737 | 10/1992 | Sklarew | 382/13 |
| 5,189,633 | 2/1993 | Bonadio | 364/709.12 |
| 5,251,292 | 10/1993 | Martel, Jr. et al. | 395/150 |

OTHER PUBLICATIONS

R. Anderson, "Syntax–Directed Recognition of Hand-Printed Two–Dimensional Mathematics," Interactive Systems for Experimental Applied Mathematics, New York, Academic Press, 1981, pp. 436–459.

W. Tsai et al., "Attributed Grammar–A Tool for Combining Syntatic and Statistical Approaches to Pattern Recognition," IEEE Transactions on Systems, Man, and Cybernetics, vol. SMC–10, No. 12, Dec. 1980, pp. 873–885.

Helm et al. "Building Visual Language Parsers". CHI '91, conference Proceedings of the ACM, pp. 105–112, 1991.

Naini, "A New Efficient Incremental Evaluator for Attribute Grammars Allowing Conditional Semantic Equations" 1988 IEEE Southeastern, pp. 386–390, Apr. 1988.

Truve. "Image Interpretation Using Multi–relational Grammars" Proc. Third Int. Conf. Comp. Vision, pp. 146–155, Dec. 1990.

Williams. "On–Line Parsing of Handprinted Mathematical Expressions: Final Report For Phase II." Dec. 1968.

(List continued on next page.)

*Primary Examiner*—Joseph Mancuso
*Assistant Examiner*—Jon Chang
*Attorney, Agent, or Firm*—Hickman Beyer & Weaver

[57] ABSTRACT

A method for processing equations in a graphical computer system characterized by the steps of: receiving at least one unit comprising an equation which was derived from a graphical user input device; parsing the units into a parsed tree utilizing a constrained attribute grammar; and deriving a result of the equation utilizing the parsed tree. Preferably, the graphical user input device is a table or the screen of a pen-based computer system, where stroke units derived from strokes made by a stylus on the screen are passed to at least one recognition domain. The process preferably also includes the steps of: receiving at least one stroke unit comprising an edit to an equation on the screen; determining whether the edit changes the structure of the parsed tree of the equation; and editing the parsed tree if the edit does not change the structure of the parsed tree. A system for processing equations is characterized by: a digital processor; a screen assembly coupled to the digital processor for displaying images in response to signals provided by the digital processor and for transmitting signals to the digital processor in response to stroke made on the screen assembly with a stylus; an equation recognizer responsive to the stroke signals and operative to detect valid equations formed on the screen; an equation solver operative to produce a result for valid equations; and a mechanism for displaying the result on the screen assembly proximate to the equation.

24 Claims, 16 Drawing Sheets

OTHER PUBLICATIONS

Blackwell et al., "An On–Line Symbolic Mathematics System Using Hand–Printed Two–Dimensional Notation," Rand Corporation, Jan. 1970.

Belaid et al., "A Syntactic Approach for Handwritten Mathematical Formula Recognition;" IEEE Trans. Pat. Analysis and Mach. Intel., vol. PAMI–6, No. 1, Jan. 1984, 105–111.

El–Sheikh, "Recognition of Handwritten Arabic Mathematical Formulas." UK IT 1990 Conference, Mar. 1990, pp. 344–351.

Avitzur. "Your Own Handprinting Recognition Engine: Algorithms for Putting Pen to Pad" Dr. Dobb's Journal vol. 17, No. 4, Apr. 1992, pp. 32–36.

O'Connor, Rory J., "Apple banking on Newton's brain," San Jose Mercury News, Apr. 22, 1992.

Weiman et al., "A Step Toward the Future" Macword, Aug. 1992, p. 129.

M. Soviero, "Your World According to Newton" Popular Science, Sep. 1992.

F. Abatemarco, "From the Editor" Popular Science, Sep. 1992, p. 4.

*Macintosh User's Guide,* applied Computer, Inc. 1991 pp. 47–50.

METHOD AND APPARATUS FOR PROCESSING GRAPHICALLY INPUT EQUATIONS

CROSS-REFERENCE TO RELATED APPLICATIONS

This application is a continuation-in-part of the following co-pending U.S. patent applications:

1. "Constrained Attribute Grammars for Syntactic Pattern Recognition", of Giulia Pagallo, U.S. Pat. No. 5,317,647 U.S. Ser. No. 07/864,607, filed Apr. 7, 1992, and assigned to Apple Computer, Inc.
2. "Recognition Architecture and Interface", of Beernink et al., U.S. Pat. No. 5,463,696 U.S. Ser. No. 07/889,216, filed May 27, 1992 and assigned to Apple Computer, Inc.;
3. "Method and Apparatus for Computerized Recognition", of Pagallo et al., U.S. Ser. No. 08/001,123, filed Jan. 5, 1993, and assigned to Apple Computer, Inc.

The disclosures of each of these parent applications are hereby incorporated herein by reference in their entirety.

BACKGROUND OF THE INVENTION

This invention relates generally to the computerized recognition of user inputs, and more particularly to equation recognition in a pen-based computer system.

A pen-based computer system typically comprises a small, hand-held computer where the primary method for inputting data includes a "pen" or stylus which "writes" upon the screen of the computer system. The screen is a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. Besides serving as a notepad, pen-based computers can provide a number of useful functions, such as serving as an address book, an appointment calendar, a to-do list, a calculator, etc.

Ink on the screen of a pen-based computer system is typically stored as a simple bit-map. Essentially, the only knowledge that the computer system has of the inked image is that certain pixels of the display are to be activated to create the inked image. Therefore a note, such as "3+4=" has no meaning to the system other than certain pixels of the screen are to be turned on or off to create the inked image of the equation.

It is often desirable to perform some level of recognition on the inked objects formed on the computer screen. In this way, additional meaning can be attached to the inked objects allowing the computer to manipulate the objects in a more intelligent fashion. Recognition systems for characters and words are fairly well known. The present invention is concerned with the recognition, solving, and editing of equations and the like.

It is known that the symbols or characters comprising a class of patterns (language) have relationships that can be defined in terms of a grammar (also known as syntactic methods). A grammar is a set of syntactic rules and symbols which define a language (or domain). Different grammars may have different types of rules and/or symbols. The language may be a spoken language, e.g. English or French, or it could be a computer language, e.g. Fortran or PASCAL. The syntactic rules define a method by which an expression may be identified as a valid or invalid expression in a language. In Computer Science, grammars have also been used to describe the logic of computing. Basic courses in automata theory use grammars to define finite and non-finite computing models.

With respect to pattern recognition, it is desirable to use syntactic methods when it is convenient to represent a pattern as a collection of one or more subpatterns. A subpattern is defined as a symbol or a group of related symbols. For a written language a symbol may be a letter of an alphabet or a mathematical operator or a graphical symbol. Syntactic methods are also desirable when the validity of a pattern depends on the relationships of its subpatterns. For example, for recognizing the validity of an equation, it may not be valid to have two mathematical operators being adjacent, even though on their own, each operator is a valid symbol in the grammar.

While a grammar defines the valid symbols and syntactic rules, a particular pattern is analyzed using a parsing process. Conventional methods of parsing are linear, i.e. top-down or bottom-up. A parsing process will determine whether a pattern is valid or invalid. The parsing process will determine validity via a lexical analysis (i.e. checking the validity of the individual subpatterns) and by determining that the syntactic rules are followed. If the pattern is valid, the parsing process will return a parsed representation of the pattern according to the syntactic rules. If the pattern is invalid, the parsing process may terminate and provide information as to why the pattern is invalid.

As noted above, in the art of pattern recognition, syntactic methods have been utilized. One such syntactic method is known as an attribute grammar. Attribute grammars are discussed in an article entitled *"Attributed Grammar—A Tool for Combining Syntactic and Statistical Approaches to Pattern Recognition"*, Wen-Hsiang Tsai and King-Su Fu, published in *IEEE Transactions on Systems, Man, and Cybernetics*, pgs. 873–885, Vol. SMC-10, No. 12, December 1980. In an attribute grammar, semantic information of the patterns is combined with the syntactic rules to create a production rule. The syntactic rules establish a relationship among subpatterns. The semantic information is used to compute attributes of a pattern using the attributes of the related subpatterns. The attributes of a related subpattern may also be used to indicate the applicability of a production rule.

An attribute grammar is defined as a five tuple $$G = (V_T, V_N, A, P, S),$$

where $V_T$ is a set of terminal symbols, $V_N$ is a set of nonterminal symbols, A is a set of attributes, P is a set of production rules, and S is the start symbol. A symbol is merely a representation of a pattern or subpattern within the grammar. A terminal symbol represents subpatterns that cannot be further divided (e.g. a letter in an alphabet), whereas a nonterminal symbol represents a subpattern that may be further divided. For each $x \in V_T \cup V_N$, the expression A(x) denotes the attribute values of x, although some of the attribute values may be undefined for a given symbol. Each production rule in P has two parts, the first part of the rule specifies a syntactic restriction among the symbols and the second part of the rule specifies a semantic restriction among the symbols. The syntactic part is of context-free form. The semantic part describes how the attribute values of the left-hand side symbol of the syntactic rule are computed in terms of the attribute values of the symbols on the right-hand-side. Alternatively, the semantic part can indicate under which conditions the syntactic rule applies. Formally, the syntactic pan of a rule is:

$$B \rightarrow B_1 B_2 \ldots B_n$$

where $B_i \in V_N \cup V_T$, for $1 \leq i \leq n$.

The semantic part of the rule is a set of mappings. There are as many mappings as the number of attributes for the nonterminal B. Each mapping computes the corresponding attribute value of B from the attribute values of $B_1 B_2 \ldots B_n$.

Known attribute grammars are limited to defining one-dimensional relationships between subpatterns. It has been recognized that for some applications it is desirable to define multi-dimensional relationships between the subpatterns. This may occur for example in the analysis of mathematical expressions or fractions. In a fraction, one integer value is above a fraction line while a second integer value is below the fraction line. The same can be true for sub-expressions of a mathematical expression. Here, the relationships between the symbols are both horizontal and vertical (i.e. two-dimensional).

A method for describing and analyzing patterns with 2-D relationships is described in a paper entitled "*Syntax-Directed Recognition of Hand-Printed Two-Dimensional Mathematics*", Robert H. Anderson, *Interactive Systems for Experimental Applied Mathematics*, pgs. 436–459, New York, Academic Press, 1981. The Anderson paper describes syntax rules for driving a parsing process. The syntax rules have corresponding conditions for positively identifying particular input. However, the method described requires extensive computing resources to perform a pattern recognition analysis. This is because the associated parsing requires the examination of an overly broad set of permutations of the subpatterns which comprise the pattern. In particular, the described method does not provide for the use of keywords or heuristic information within the parsing process.

SUMMARY OF THE INVENTION

A method and apparatus are disclosed for processing equations in graphical computer systems and, more particularly, in pen-based graphical computer systems. The method includes the steps of: receiving at least one unit comprising an equation which were derived from a graphical user input device; parsing the at least one unit into a parsed tree utilizing a constrained attribute grammar; and deriving a result of the equation utilizing the parsed tree. Preferably, the user input device is the screen of a pen-based computer system where strokes on the screen form the equation and are used to derive the plurality of units. Once the result has been calculated, it can be displayed on the screen proximate to the equation appearing on the screen.

A method for processing equations in a pen-based computer system includes the steps of: receiving strokes units derived from stroke made by a stylus on a screen of a pen-based computer system, where the strokes form an equation on the screen; passing the stroke units to a number of recognition domains, where at least one of the domains is capable of parsing equations into a parsed tree utilizing a constrained attribute grammar; deriving a result of the equation (if requested) utilizing the parsed tree; and displaying the result on the screen proximate to the equation. The method also includes the steps of receiving at least one stroke unit which comprises an edit to an equation on the screen; determining whether the edit changes the structure of the parsed tree; and editing the parsed tree if the edit does not changed its structure.

A system for processing equations in accordance with the present invention comprises: a digital processor; a screen assembly coupled to the digital processor, where the screen assembly can display images in response to signals generated by the digital processor and can transmit stroke signals to the digital processor in response to the movement of a stylus across the screen assembly; an equation recognizer responsive to the stroke signals and operative to detect valid equations formed on the screen assembly; an equation solver operative to provide a result for the valid equations; and a mechanism for displaying the result on the screen assembly in proximity to the equation. The equation recognizer includes a mechanism for parsing an equation and a mechanism for detecting whether a valid parsed tree has been formed from the equation. The system also preferably includes: a mechanism for detecting whether an edit has been made to a solved equation displayed on the screen assembly; a mechanism for determining whether the edit changes the structure of the parsed tree for the solved equation; and a mechanism for editing the parsed tree if the edit changes do not change the structure of the parsed tree.

The present invention utilizes an equation recognizer including two portions; a language definition portion (rules) and a verification (parser) portion. The language definition or rules portion is embodied by a constrained attribute grammar. The constrained attribute grammar includes sets of nonterminal, keyword and non-keyword symbols, attribute definitions corresponding to each symbol, a set of production rules, and a relevance measure for each of the keyword symbols. The production rules include syntactic, semantic, constraints and action portion. The syntactic portion defines a relation between symbols. The semantic portions defines a relationship based on the attributes of symbols. The constraints portion includes definitions for multi-dimensional relationships between symbols. The action portion defines the action that is performed if the rule matches. The verification portion is a parser comprised of a parsing scheme that takes a set of input subpatterns provided by a character recognition system and determines whether the input subpatterns define a valid pattern according to a language implementation of the grammar. The output of the verification portion is a tree structured representation of the pattern, referred to herein as a "parsed tree".

The parser of the preferred embodiment is preferably a computer implemented process that includes the steps of providing an instance of a constrained attribute grammar, a set of input subpatterns and the grammar start symbol to a parsing means, parsing the set of input subpatterns to determine if the set of input subpatterns can be rewritten as the start symbol according to the set of production rules; if the set of input subpatterns can be rewritten as the start symbol according to the set of production rules, returning a parsed representation of the set of input subpatterns; and if the set of input subpatterns cannot be rewritten as the start symbol according to the set of production rules, returning information as to why the set of input subpatterns is invalid.

An advantage of the present invention is that hand-written equations can be entered into a computer system, solved, and the result can be displayed on an output screen of the computer system.

Another advantage of the present invention is that, under some circumstances, a hand-written equation can be edited without re-parsing the entire equation.

Yet another advantage of the present invention is that visually presented, multi-dimensional equations can be recognized and solved in a computer system.

These and other objects and advantages of the present invention will become apparent upon reading the following detailed descriptions and studying the various figures of the drawings.

BRIEF DESCRIPTION OF THE DRAWINGS

FIGS. 12a, 12b, and 12c illustrate three equations to be processed by the present invention.

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
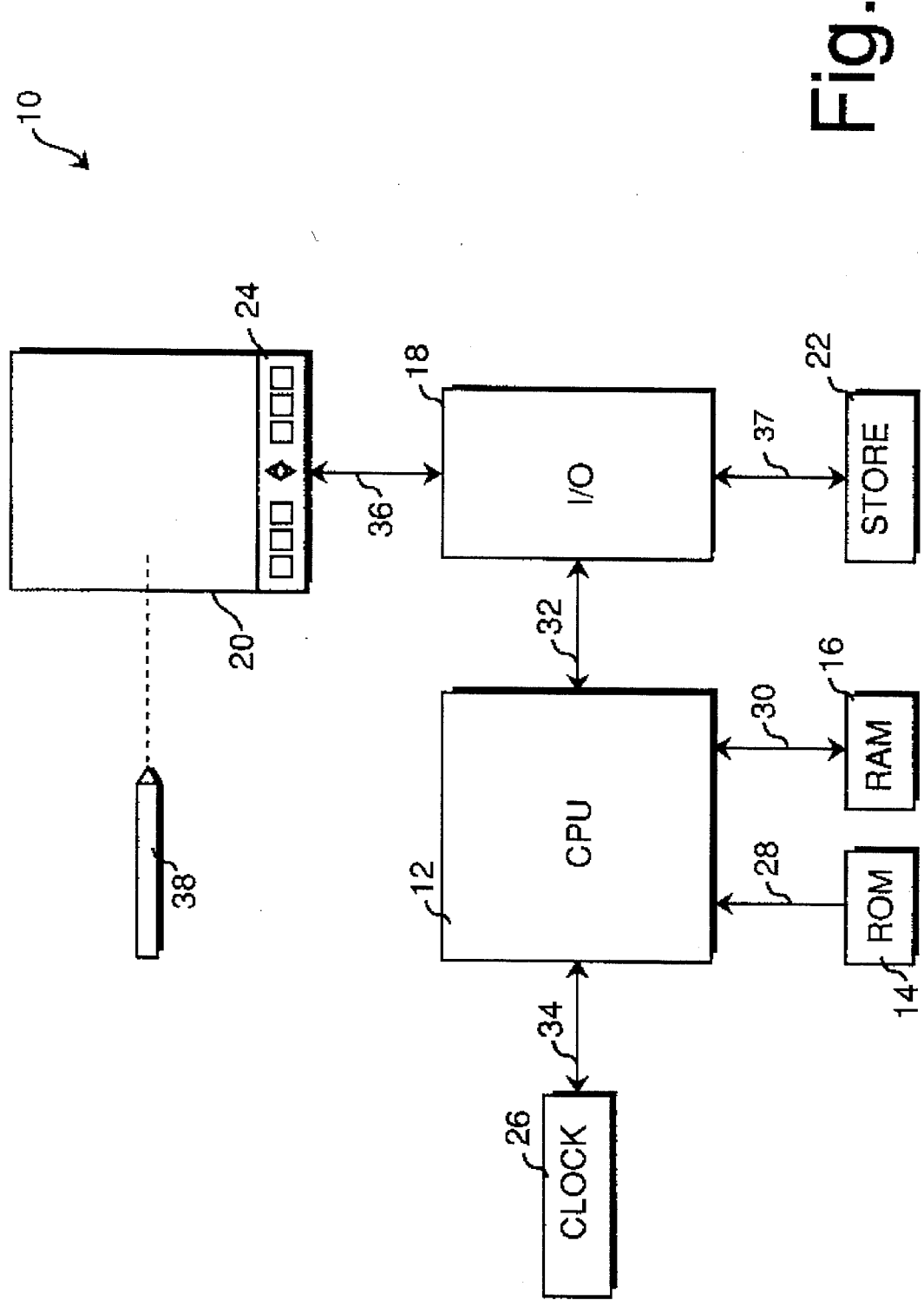
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by a data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. With such a structure, the display assembly 20 can serve as an input "tablet". These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array 9f switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
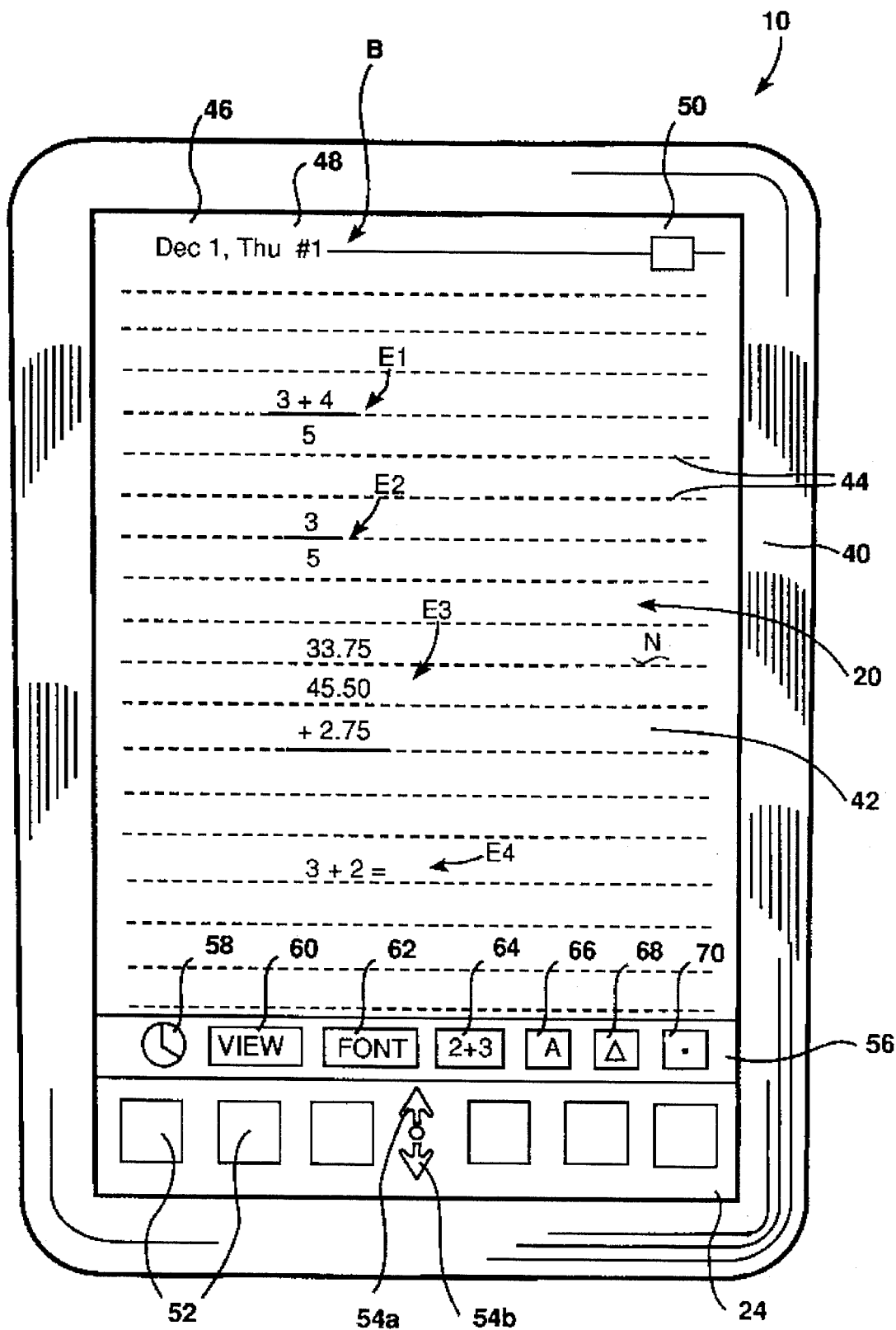
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in copending U.S. Patent application Ser. No. 07/868,013, filed Apr. 13, 1992 on behalf of Tchao et al. cited previously. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, an equations button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

A number of equations E1, E2, E3, and E4 are displayed on screen 42. These equations were entered by strokes of the stylus 38 on the screen. The method and apparatus can process these hand-written equations to provide their results, and can display the results on the screen in proximity to their respective equation.

Figure 3:
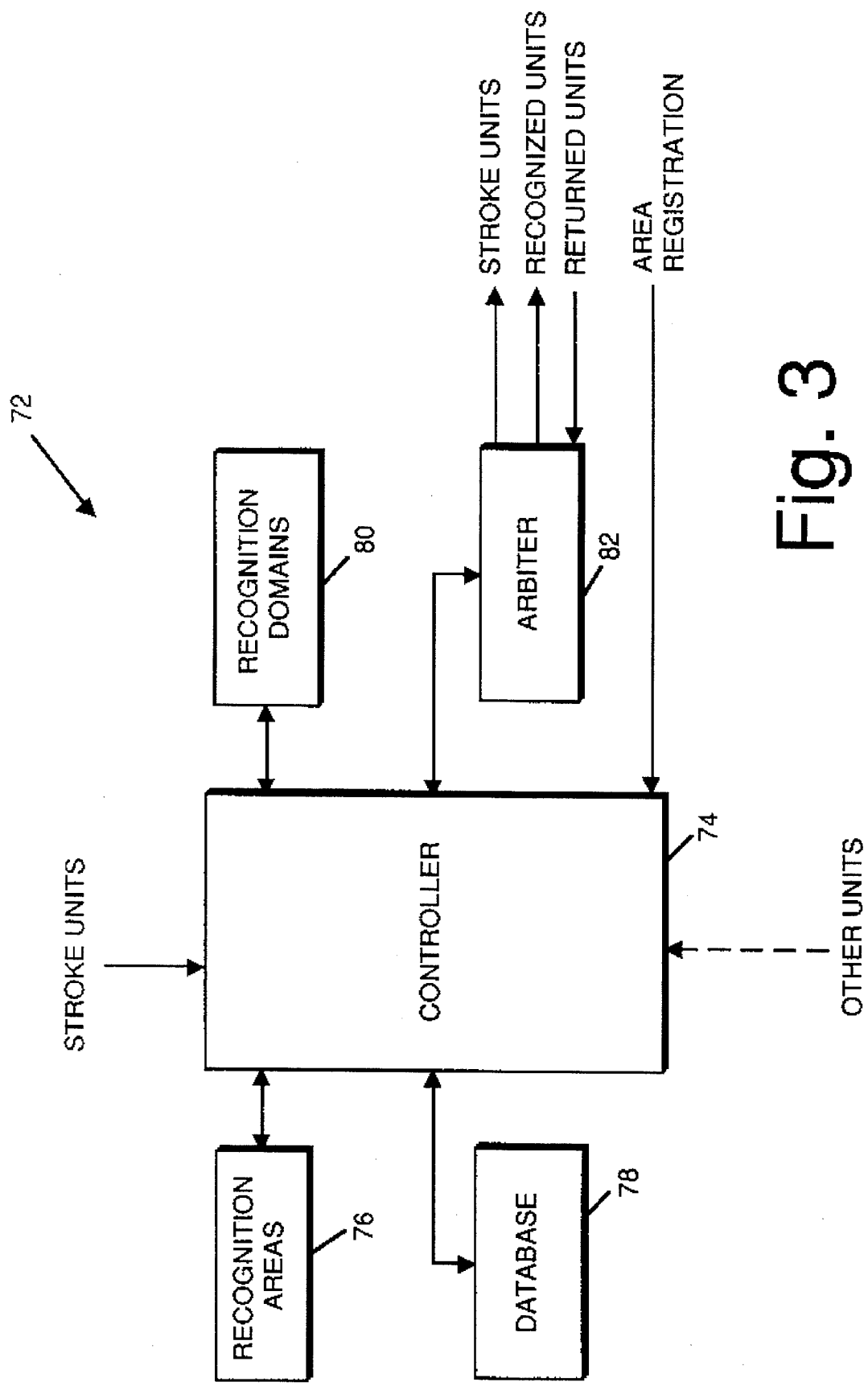
FIG. 3 is a block diagram of the structure of a recognition system of the present invention.

In FIG. 3, the structure of a recognition system 72 of the present invention is illustrated. The recognition system 72 includes a controller 74, recognition areas 76, a database 78, recognition domains 80, and an arbiter 82. The controller 74 has, as inputs, stroke units, other types of units (optional), and area registration information. The arbiter 82 has an input for returned units from an application program, and has outputs for stroke units and recognized units. A complete discussion of recognition system 72 is found in parent application "Method and Apparatus for Computerized Recognitions", of Pagallo et al., U.S. Ser. No. 08/001,123 filed Jan. 5, 1993, and assigned to Apple Computer, Inc., the disclosure of which has been incorporated herein by reference.

Figure 4:
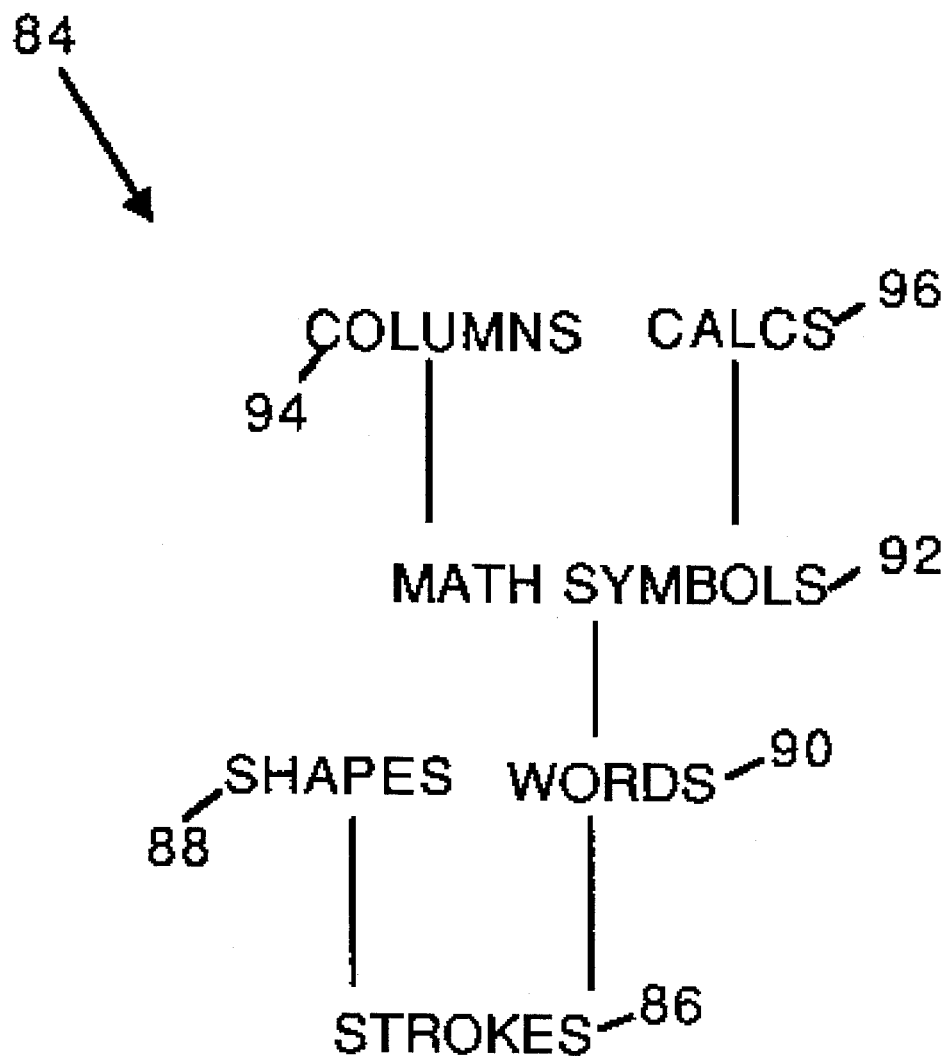
FIG. 4 illustrates the recognition domain hierarchy in accordance with the present invention.

The recognition domains 80 are related in a hierarchical fashion. With reference to FIG. 4, a recognition domain hierarchy used in this preferred embodiment includes a base stroke domain 86, a first tier shape domain 88, a first tier words domain 90, a second tier math symbols domain 92, a third tier columns domain 94, and a third tier calcs domain 96. Each recognition domain 88–96 has, as inputs, units of the type of the connected domain below it, and each recognition domain 88–96 has, as outputs, units of its own type. For example, the word recognition domain 90 has, as inputs, stroke units and has, as outputs, word units. The math symbols recognition domain 92 has, as inputs, word units and has, as outputs, math symbol units. It should be noted that, in the present implementation, stroke units comprising portions of an equation are recognized by the words recognition domain as special forms of words.

Figure 5:
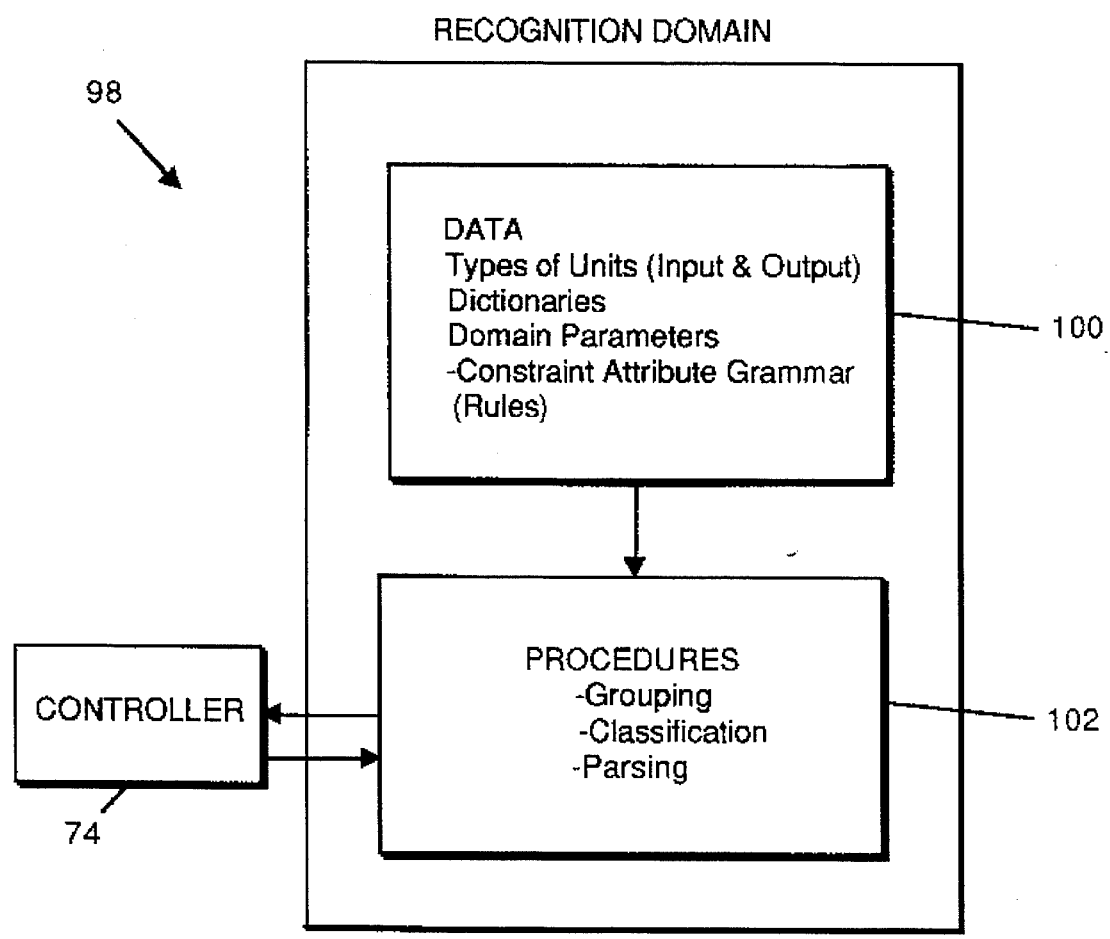
FIG. 5 illustrates a single recognition domain of the present invention.

FIG. 5 illustrates an exemplary recognition domain 98 of the recognition domains 80 of FIG. 3. This recognition domain 98 is, itself, an object including a data portion 100 and a procedures portion 102. The procedures portion 102 communicates with the controller 74 in a dialogue-like fashion. The procedures portion 102 has access to the data portion 100, which includes such data as the type of units recognized by the recognition domain 98, dictionaries, domain parameters, and constraint attribute grammar (rules), if applicable. Each domain 98 has both grouping and classification capabilities. A portion of the classification capabilities of the domain includes the parser to be discussed subsequently.

In the following discussions, it will be assumed that the constraint attribute grammar will be provided in the data portion of a recognition domain, and the parsing method ("parser") will be included under the classification procedures of the procedures portion of a recognition domain. The parser or parsing method tends to be invariant from domain-to-domain, while the constraint attribute grammar is domain specific. Therefore the parser for the columns recognition domain and the calcs recognition domain can conveniently use the same procedures, while each of the columns recognition domain and the calcs recognition domain will have their own constraint attribute grammar.

Figure 6:
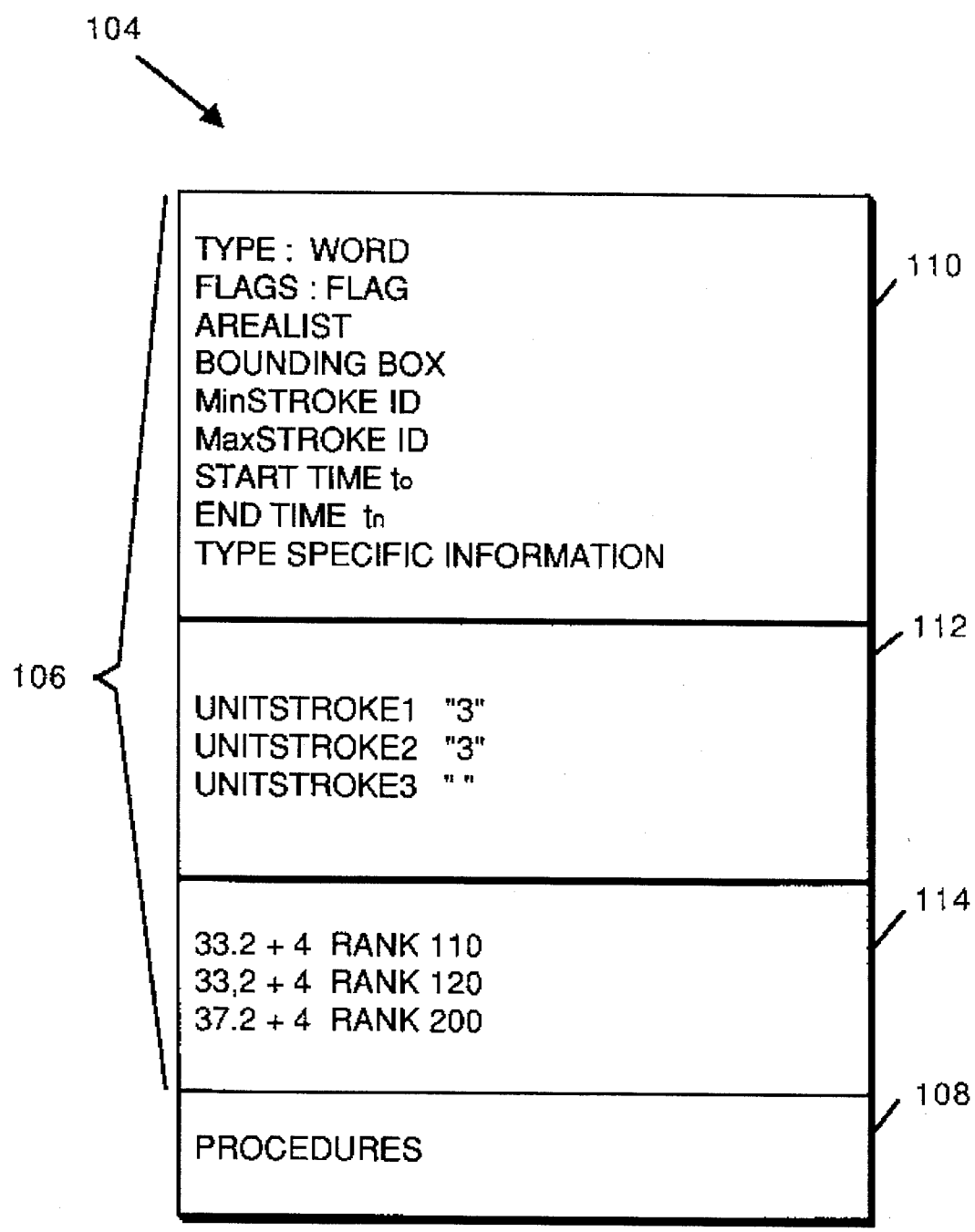
FIG. 6 illustrates a word unit of the present invention.

FIG. 6 is used to illustrate the structure of a word unit 104 in greater detail. A word unit such as the word unit of FIG. 6 can be produced by a word domain 90. A word unit 104 includes a data portion 106 and a procedures portion 108. The data portion 106 includes a generic section 110, a subunit section 112, and an interpretation section 114. The generic section includes data types which will be found in all unit structures. For example, the generic section will include the type (which in this case is word), flags, an AREALIST, a bounding box, minSTROKEID, maxSTROKEID, START-TIME $t_o$, ENDTIME $t_n$, and type specific information. The subunit section 112 will contain subunits of the unit 104. For example, if the unit 104 is the word (equation) "33.2+4" it could have three subunits, UNITSTROKE1, UNITSTROKE2, and UNITSTROKE3. In this instance the subunits are as follows:

UNITSTROKE1="3"

UNITSTROKE2="3"

UNITSTROKE3="."

The interpretation data section 114 is a list of the interpretations for the unit 104 with their rankings. In this example, the word "33.2+4" has attained a rank 110, the word "33,2+4" has attained a rank 120, and the word "37.2+4" has attained a rank of 200. The lower the rank number of the interpretation, the higher the level of confidence that the object has been recognized correctly. The procedures portion 108 include methods and processes which allow the unit to operate as an object.

Figure 7:
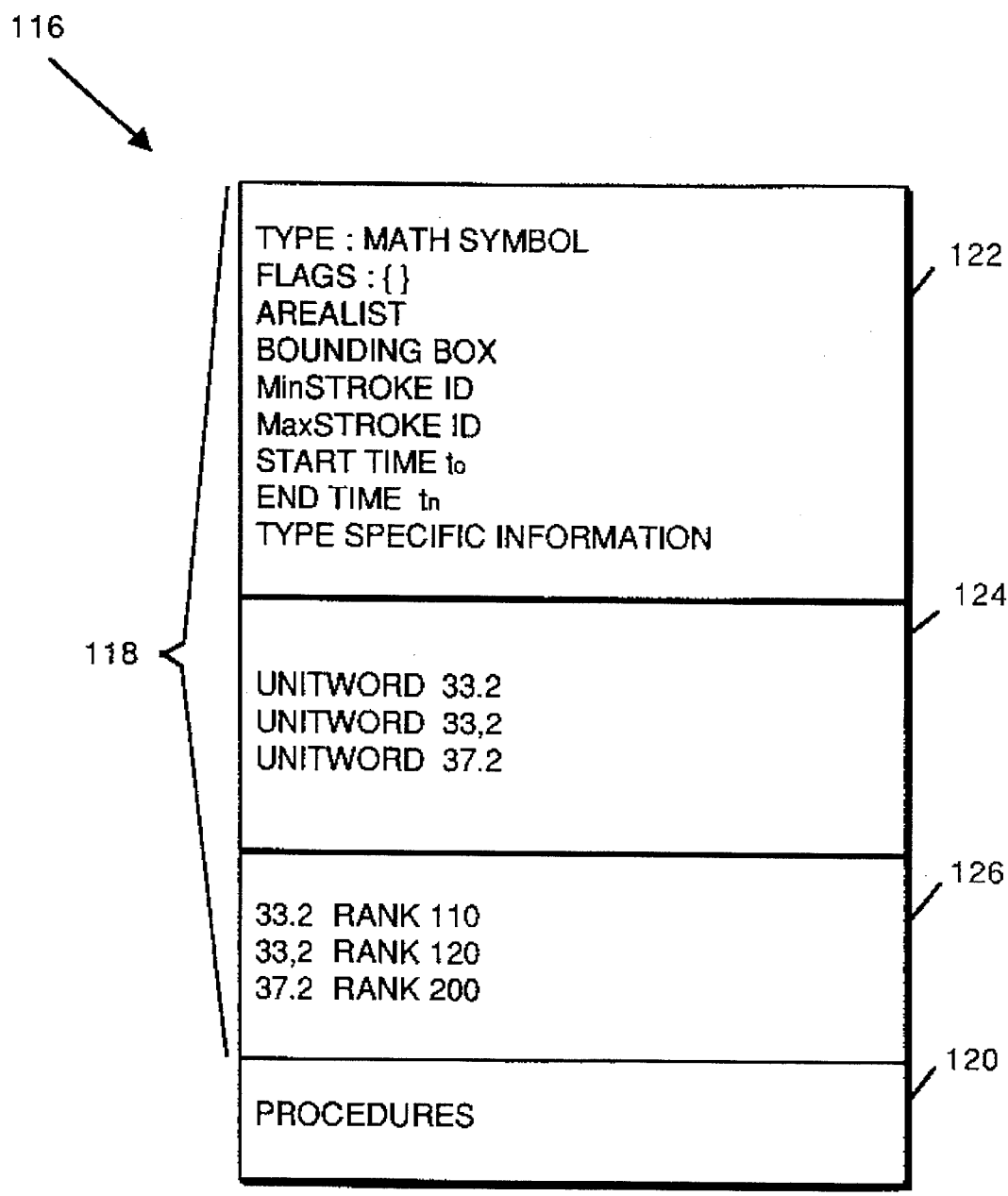
FIG. 7 illustrates a math symbol unit of the present invention.

FIG. 7 is used to illustrate the structure of an exemplary math symbol unit 116. A math symbol unit of FIG. 7 can be produced by a math symbols recognition domain 92. Math symbol unit 116 includes a data portion 118 and a procedures portion 120. The data portion 118 includes a generic section 122, a subunit section 124, and an interpretation section 126. As before, the generic section will include the type (which in this case is MATH SYMBOL), flags, an AREALIST, a bounding box, minSTROKEID, maxSTROKEID, START-TIME $t_o$, ENDTIME $t_n$, and type specific information. The subunit section 124 will contain subunits of the unit 116. For example, if the unit 116 is the math symbol "33.2" it could have three subunits, UNITWORD1, UNITWORD2, and UNITWORD3. In this instance the subunits are as follows:

UNITWORD1="33.2"

UNITWORD2="33,2"

UNITWORD3="37.2"

The interpretation data section 126 is a list of the interpretations for the unit 116 with their rankings. In this example, the word "33.2" has attained a rank 110, the word "33,2" has attained a rank 120, and the word "37.2" has attained a rank of 200. The lower the rank number of the interpretation, the higher the level of confidence that the object has been recognized correctly. The procedures portion 120 include methods and processes which allow the unit to operate as an object.

As seen in FIG. 4, a math symbols unit can be passed to both the columns recognition domain and the calcs recognition domain. It is possible, but not likely, that both recognition domains will interpret the math symbols units as a valid equation. If there are two or more competing recognition results, arbiter 82 (FIG. 3) can choose a "best guess" recognition result based, in part, on the ranking of their interpretations. More likely, only one of the two recognition domains will result in a valid parsed tree for a given set of math symbols units, thereby avoiding potential conflicts.

At this point in order to avoid subsequent confusion, it is instructive to distinguish the present invention from a use of the present invention. A particular language is said to be an instance of a grammar. Thus, in the following description, the class of constrained attribute grammars and the parsing scheme represent the preferred embodiment, whereas the exemplary mathematical expression language represents an instance of the preferred embodiment.

Figure 8A:
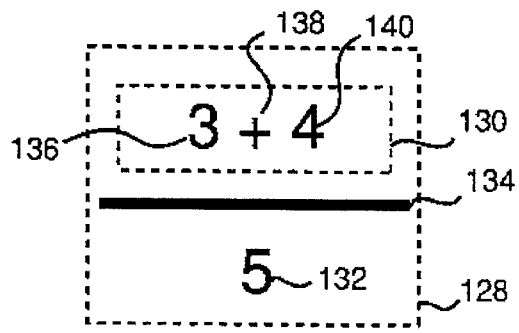
FIGS. 8a, 8b, and 8c are examples of equations to be processed by the present invention.

It would also be useful at this point to define some terms that will be used throughout this description. A pattern denotes the object to be recognized as valid or invalid. A pattern is typically comprised of one or more subpatterns. A subpattern corresponds to an individual character or a set of related characters. Referring briefly to FIG. 8a, the mathematical expression $$\frac{"3+4"}{5}$$

128 is a pattern, while the subexpressions "3+4" 130, the division symbol 134 and the number "5" 132 are subpatterns. Further, each of the individual characters "3" 136, "+" 138 and "4" 140 would also represent subpatterns.

In the foregoing definitions, the references will be to visual language recognition systems. However, such definitions are not meant to limit the scope of the present invention. It would be apparent to one skilled in the art that the concepts described are extensible to other areas wherein syntactic methods may be used.

The types of symbols as used in the description of a constrained attribute grammar are now discussed. A symbol is merely a representation within the grammar, of a pattern or a subpattern. There are four basic types of symbols: keyword, non-keyword, terminal and nonterminal symbols. A keyword symbol holds a special significance in parsing. A keyword symbol provides a local starting point for a parsing process. For example, with respect to FIG. 8a, the division symbol 134 is a keyword. Next, a non-keyword symbol represents a character that is not a keyword. For example, with respect to FIG. 8a, the "3" and "4" are represented by non-keyword symbols. Collectively, the set of keyword and non-keyword symbols are called terminal symbols. Nonterminal symbols represent subpatterns that are not terminal symbols. For example, the sub-expression "3+4" 130 would be represented by a nonterminal symbol.

A pattern recognition system in the preferred embodiment is generally a functional component in a recognition system. Such a recognition system may be used for recognizing visual languages, e.g. organizational charts or mathematical expressions or written music scores. Input for the pattern recognition system would come from a character recognition system or a similar system that may provide a set of terminal symbol level subpatterns. The output of the pattern recognition system would be to a data manipulation system. For example, a pattern recognition system may be embodied within a calculating system where a user "writes" the equation that is to be performed on a graphical tablet. The character recognition system would separate and identify the individual "written" characters and symbols. The pattern recognition system will determine if the "written" characters are syntactically valid, i.e. that they construct a valid expression. Finally, the data manipulation system would perform the mathematical calculation, if requested, i.e. the expression is solved to produce a result. As is well known to those skilled in the art, this is accomplished by executing the operator at each node of the parsed tree using the operands of the parsed tree. In the current implementation, there is a procedure that traverses the tree in post-order to produce the result.

The pattern recognition system of the preferred embodiment provides for the instantiation of a language using the framework of constrained attribute grammars. Briefly, the class of constrained attribute grammars adds dimensional constraints to the framework of attribute grammars (previously described with respect to the prior art). Such dimensional constraints allows for implementation of languages which have subpatterns with multi-dimensional relationships. The class of constrained attribute grammars is described in more detail below.

The function of a grammar in pattern recognition is exemplified in the analysis of simple mathematical expressions. Using standard English notation, the expression "3+5" is valid. However, the same characters can be rearranged to create an expression for example, "3 5+", which is invalid. Moreover, in a polish notation the expression "+3 5" is valid while the expression "3+5" is invalid. In this example, if the selected grammar was for English notation, an expression with the key symbol "+" is only valid when it has numbers on both sides.

The verification portion of the pattern recognition system is defined in terms of a Parser (preferably located in the classification section of the procedures portion of a recognition domain). A Parser interprets patterns according to a particular grammar (preferably located in the data portion of the recognition domain). A Parser will apply the rules of the grammar to the pattern to determine if the dimensional and syntactic relationships defined by the grammar are in place. If the relationships are not in place, the pattern is determined to be invalid. If the relationships are in place, the Parser provides a tree-structured representation of the input pattern, that corresponds to the rules of the grammar. The tree-structured representation provides a logical organization of the data for the data manipulation system.

As noted above, the class of constrained attribute grammars of the preferred embodiment provides for defining patterns whose subpatterns have multi-dimensional relationships. Referring again to FIG. 8a, a pattern whose subpatterns have a two dimensional (2-D) spatial relationship is illustrated. In FIG. 2, the mathematical expression $$\frac{\text{"3 + 4"}}{5}$$

201 is illustrated. The sub-expression 130, "3+4" is above a subpattern 134, here the division symbol. For this example, subpattern 134 is a keyword. Thus, a subpattern 132, here the number "5" is below the keyword 134. One aspect of the spatial relationship for the pattern 128 is defined with respect to keyword 134 (although in the preferred embodiment, the spatial relationships are not limited to those involving a keyword). Here, for a valid pattern to exist a first subpattern must be above the keyword 134 and a second subpattern must be below the keyword 134. Thus, a valid vertical relationship between subpatterns must be established.

A second aspect of the spatial relationships is found in the subpattern 130 "3+4". Here, the subpattern is comprised of keyword 138 "+" and subpatterns 136 "3" and 140 "4". In order for the subpattern 138 to define a valid pattern, a subpattern must be to the left of the keyword 138 and a subpattern must be to the right of keyword 138. Thus, a valid horizontal relationship between subpatterns must exist. Here, the subpatterns 130 and 132 satisfy the required vertical criteria and the subpatterns 136 and 140 satisfy the required horizontal criteria. The manner in which it is determined that such criteria is satisfied is described with respect to attributes of the subpattern.

Figure 8B:
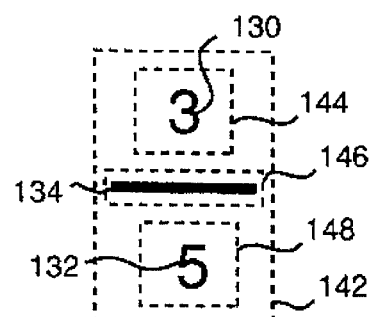

As it will be described in more detail below, each terminal and non-terminal symbol in a constrained attribute grammar has an associated list of attributes. These attributes relate to properties of a corresponding subpattern. For example, for an instance of a visual language, the attribute associated to a pattern may be a boundary rectangle. A boundary rectangle is created by projecting the pattern onto an X-Y coordinate system and determining the rectangle which bounds the pattern. FIG. 8b illustrates boundary rectangles of a subpattern in the pattern 128 of FIG. 8a. It should be noted that the boundary rectangles as illustrated in FIG. 8b are not precise in that they are larger than would be actually defined. This is done for the purpose of illustration so that the different boundary rectangles could be clearly distinguished. For further clarity, it is assumed that the pattern 128 represents a nonterminal symbol. A boundary rectangle 142 for the nonterminal symbol encompasses the entire pattern. As will be described below with respect to a specific language implementation example, the boundary rectangle for a nonterminal symbol is merely the union of the boundary rectangles of the non-keywords and keywords that comprise the nonterminal. Further, boundary rectangles 144, 146 and 148 are illustrated and correspond to subpattern 130, keyword subpattern 134 and subpattern 132, respectively. Each of the boundary rectangles may be defined in terms of its coordinate values. In order to determine whether specified spatial constraints are met, the boundary rectangles are compared. As illustrated in FIG. 8b, the boundary rectangle 144 of the subpattern 130 is to the north of the boundary rectangle 146 for the keyword subpattern 134. Further, the boundary rectangle 148 of the subpattern 132 is to the south of the boundary rectangle 146 for the keyword subpattern 134. Thus, the spatial constraints for a valid pattern including a division symbol, are met.

Figure 8C:
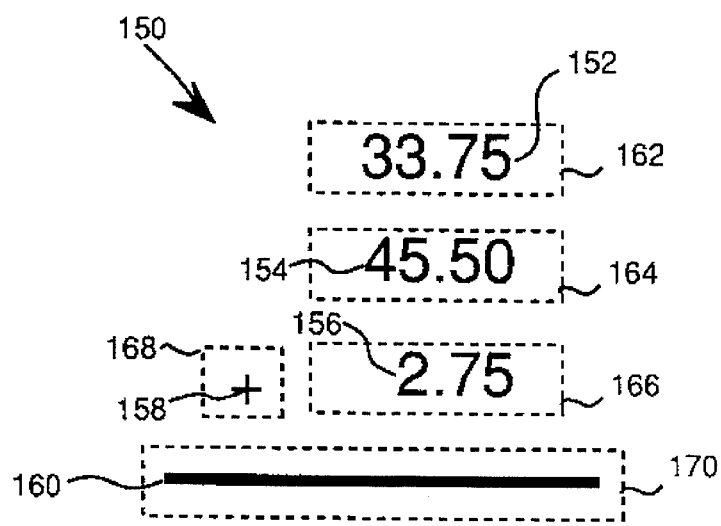

The type of equations illustrated in FIGS. 8a and 8b will be referred herein as "calculations" or "calcs" and are parsed in the calcs recognition domain 96. FIG. 8c illustrates a related but different type of equation known as "column calculations" or "column" which is parsed in the columns recognition domain 94. Both "column" and "calcs" are specific instances of the general pattern recognition algorithms discussed herein.

As seen in FIG. 8c, a pattern comprises a number of subpatterns 152, 154, 156, 158, and 160. Some of these subpatterns, namely subpatterns 158 and 160 are keyword subpatterns. Each of the subpatterns 152–160 are provide with a boundary rectangle 162–170, respectively.

A constrained attribute grammar differs from known grammars by adding dimensional constraints to a set of syntactic and semantic rules. A further distinction is a refinement in the classification of terminal symbols. A constrained attribute grammar is a seven-tuple $$G = (V_N, V_K, V_{NK}, A, P, S, M).$$

In the grammar, $V_N$ is a set of nonterminal symbols (nonterminals), $V_K$ is a set of keyword symbols (keywords) and $V_{NK}$ is a set of non-keyword symbols (non-keywords). It should further be noted that the combined set of keyword symbols $V_K$ and non-keyword symbols $V_{NK}$ (i.e. $V_T = V_K \cup V_{NK}$) is referred to as the set of terminal symbols $V_T$ (terminals). It should be noted that the terminal symbols will typically represent the initial input subpatterns to the parsing method of the preferred embodiment. The reason for the classification of terminal symbols into separate classes is described in more detail below.

A is a set of attributes so that for each $x \in V_T \cup V_N$, A (x) denotes the attribute values of x. Attributes describe a physical characteristic, e.g. the coordinates of a boundary rectangle enclosing a terminal symbol or a nonterminal symbol. It should be noted that some attributes may be undefined for a particular symbol.

P is a set of production rules. Production rules define the syntactic and semantic rules, the constraints that must exist between terminals and/or nonterminals in order to have a valid pattern, and the action that is taken when a rule matches. Production rules are discussed in more detail below. S is the start symbol. The start symbol S is a nonterminal symbol that is used to indicated the root node for a tree structure that will be generated during the parsing step. Finally, M is a mapping from the set of keywords into the real numbers. The mapping M will provide a weighting factor for the keyword symbols and will provide a processing order for a generated parse tree.

As described above, the set of keyword symbols $V_K$ combined with the set of nonkeywords symbols $V_N$ K comprise the set of terminal symbols $V_T$. The set of terminal symbols $V_T$ is divided into keyword symbols and non-keyword symbols for several reasons. A first reason is that a keyword symbol may be conveniently used as a local starting point for parsing. Hence, a keyword symbol may be used as a handle for parsing a subset of the input. As described above, the relevance measure of keywords used in conjunction with constraints, provides a simple method for imposing an order in which to select the local starting input symbols. A second reason for the terminal symbol dichotomy is to make the representation of production rule constraints uniform. All constraints in a given rule may use the same keyword as a reference point. However, this could be easily generalized. The use of keywords in each production rule of a grammar is not required. However, the use of keywords for any of the reasons stated above may have the effect of simplifying the parsing process.

Referring back to the production rules as described above, each production rule in P consists of four parts: a syntactic part, a semantic part, a constraint part and an action part. The syntactic part of the rule has the form $B \rightarrow B_1 B_2 \ldots B_n$ where n is a positive integer, $B \in V_N$ and $B_1 \in V_N \cup V_T$ where $B_i \in V_N \cup V_{NK}$, for $2 \leq i \leq n$.

From this definition it can be seen that a rule has at most one keyword associated with it. As it will become apparent, the requirement that each rule has at most one keyword and that such a keyword is listed as the first symbol on the fight hand side aids parsing. However, this requirement is not a limitation because a rule that would require more than one keyword can be rewritten as a sequence of rules with at most one keyword, and because rule symbols can be written in any order through the use of constraints. The syntactic and semantic parts of a production rule have the same interpretation as they do in attribute grammars. The constraint part of a rule establishes a correspondence between input symbols and symbols on the fight hand side of the syntactic rule. There is a constraint for each symbol on the fight hand side of the syntactic part of a rule. However, there are instances in which a rule is satisfied solely if the syntactic part is satisfied (e.g. when a constraint is valid for any symbol). Each input symbol that satisfies the constraint fox a rule symbol is in correspondence with that rule symbol. Constraints are frequently expressed in terms of attributes of the symbols. For instance, assume that the attributes of the symbols are the corner points of their bounding rectangles. A desired constraint for a nonterminal symbol in a rule may be to limit the input symbols associated with this rule symbol be to those to the right of the keyword. This constraint may be established in terms of the bounding rectangles of the input symbols (e.g. the bounding rectangle of the input symbol must be to the right of the bounding rectangle for the keyword). However, other types of constraints are possible. As mentioned above, constraints may also be used to impose an order of parsing based on the relevance measure of keywords.

Further associated with each rule is an action. The action part of a rule encodes an action that is taken when the rule is matched. Such an action can be encoded as a function or as a procedure. One example of an action would be to create a particular keyword if a rule does match. A second example would be to evaluate a matched subexpression. Nevertheless, the action part of a rule may be empty, i.e. no action is taken when the rule is matched.

At this point, it is useful to review the differences between attribute grammars and constrained attribute grammars. Observe that a production rule in a constrained grammar has a syntactic and a semantic part as it does in an attribute grammar. However, a constrained attribute grammar, incorporates into a production rule, constraints and actions. A constraint associates input symbols (i.e. subpatterns) to terminal and nonterminal symbols. It is the constraints which provide for the definition of spatial relationships between the subpatterns. Also, in a constrained attribute grammar a division of the terminal symbols into keywords and non-keywords is provided. Finally, a constrained attribute grammar provides for further distinguishing keywords by providing for definition of a relevance measure for each keyword.

Example of a Constrained Attribute Grammar

Using the above definition, an instance of a constrained attribute grammar for recognizing mathematical expressions is provided. Such a grammar would be useful in applications such as the recognition of mathematical expressions written on a graphical tablet. In order to simplify the example, it is assumed that the language defines two operators, addition (+) and division (−), and that each character in an exemplary expression of the language has been determined to be valid.

In this case, the language has the keyword "+" for addition, and the keyword "−" for division. The symbol "nk" denotes a non-keyword. The nonterminals are S, E, $E_1$, and $E_2$, where S is the start symbol. The attribute values of a terminal symbol are the corner points of the bounding rectangle of a corresponding subpattern. The attribute values of a nonterminal symbol are the corner points of the minimum bounding rectangle that encloses all the corresponding subpatterns of terminal symbols which comprise the nonterminal symbol (recall that the minimum bounding rectangle for a nonterminal is simply a union of the bounding rectangles of the terminal symbols which comprise the nonterminal). So, for any terminal or nonterminal symbol x, A (x) denotes the values of the corner points of a bounding rectangle. The relevance measure M of a keyword is computed as the width of its boundary box. Here, $M(+)=32$ and $M(-)=60$.

The production rules for the grammar are described in Table A. In the constraint part of each rule, the symbol x indicates a terminal or a nonterminal symbol, while the symbol k indicates a keyword symbol. It should be noted that the production rules for this grammar have no actions.

should be noted that this syntactic part does not indicate a spatial relationship between the two nonterminals, only that two expressions must be associated with the keyword. The semantic part means that the bounding rectangle for the nonterminal E is equal to the union of the bounding rectangles of the "+" keyword and nonterminals $E_1$ and $E_2$. The constraints part provides the necessary spatial relationships. The constraint $C_O$ requires that the input symbol be the keyword "+" and that the relevance measure of the keyword "+" be greater than or equal to the relevance measure of all keywords not yet processed. If several "+" keywords have the same relevance measure, one of them is chosen arbitrarily. The constraint $C_O$ provides a means by which the parsing of keywords may be ordered. The constraint $C_1$ selects any terminal or nonterminal symbol that is to the west of the "+" keyword. The constraint $C_2$ selects any terminal or nonterminal symbol that is to the east of the "+" keyword.

TABLE A

PRODUCTION RULES

| Syntactic Part | Semantic Part | Constraints |
|---|---|---|
| 1. $S \rightarrow E\|nk$ | $A(S) = A(E)\|A(nk)$ | $C_1(x)$ = true. |
| 2. $E \rightarrow +E_1 E_2$ | $A(E) = A(+) \cup A(E1) \cup A(E_2)$ | $C_0(x) = Eq(x,+)$ and $M(x) \geq M(k)$, for all k. If more than one x satisfies $C_0$, choose one arbitrarily. $C_1(x) = West(x,+)$. $C_2(x) = East(x,+)$. |
| 3. $E \rightarrow -E_1 E_2$ | $A(E) = A(-) \cup A(E_1) \cup A(E_2)$ | $C_{0(x)} = Eq(x,-)$. and $M(x) \geq M(k)$, for all k. if more than one x satisfies $C_{0,}$ choose one arbitrarily. $C_1(x) = North(x,-)$. $C_2(x) = South(x,-)$. |
| 4. $E_1 \rightarrow E\|nk$ | $A(E_1) = A(E)\|A(nk)$ | $C_1(x)$ = true. |
| 5. $E_2 \rightarrow E\|nk$ | $A(E_1) = A(E)\|A(nk)$ | $C_1(x)$ = true. |

To establish a correspondence between constraints and input symbols, note that the symbols on right hand side of each rule are implicitly numbered 0, 1, and so on. For instance in rule 2, every input symbol that satisfies the constraint $C_1$ is in correspondence with the symbol $E_1$.

The symbols utilized in the production rules would be familiar to one skilled in the art, but definitions thereof are provided here to aid in the understanding. The symbol "$\rightarrow$" can be read as "produces". The symbol "|" can be read as "or". The symbol "$\cup$" can be read "union with". Finally, the symbol "$\epsilon$" can be read as "is an element of". It should be noted that spatial constraints, e.g. North, South, East and West are predefined functional primitives. Such functional primitives compare the bounding rectangles for symbols to determine if a predetermined spatial criteria is satisfied. It would be apparent to include other such spatial constraints, e.g. diagonals for matrix operations, to satisfy any spatial requirements for a particular language implementation.

With respect to rule 1, the syntactic part means that the start symbol S will produce the nonterminal E or the non-keyword nk. The non-keyword here would be a character or a number as defined in the language alphabet. The semantic part means that the attribute, i.e. the bounding rectangle, of the start symbol would equal the attribute of the nonterminal or non-keyword. The constraint portion indicates that any symbol satisfies the rule.

With respect to rule 2, the syntactic part means that the nonterminal E will produce a "+" keyword associated with a first nonterminal ($E_1$) and a second nonterminal ($E_2$). It With respect to rule 3, the syntactic part means that the nonterminal E will produce a "−" keyword associated with a first nonterminal ($E_1$) and a second nonterminal ($E_2$). It should be noted that this syntactic part does not indicate a spatial relationship between the two nonterminals, only that two expressions must be associated with the keyword. The semantic part means that the bounding rectangle for the nonterminal E must be equal to the union of the bounding rectangles of the "−" keyword and non terminals $E_1$ and $E_2$. The constraint part provides the necessary spatial relationships. As with rule 2, the constraint $C_O$ requires that the input symbol be the keyword "−", and that relevance measure of the keyword "−" be greater than or equal to the relevance measure of all keywords not yet processed. If several "−" keywords have the same relevance measure, one of them is chosen arbitrarily. The constraint $C_1$ selects any terminal or nonterminal symbol that is to the north of the "−" keyword. The constraint $C_2$ selects any terminal or nonterminal symbol that is to the south of the "−" keyword.

The syntactic part of rule 4 means that the nonterminal $E_1$ will produce the nonterminal E or the non-keyword nk. The semantic part means that the bounding rectangle for the nonterminal $E_1$ will equal the bounding rectangle for the nonterminal E or the non-keyword. The constraint portion indicates that any symbol satisfies the constraint. The rule 5 is identical to rule 4 except that the nonterminal $E_2$ is under consideration. The operation of all the production rules will become more apparent in the description of a Parser process described below.

Implementation Details of the Example Language

In an implementation of a constrained attribute grammar, the terminal symbols represent the alphabet of the language. The alphabet is a set of predetermined symbols. The implementation would include functions for identifying keywords and non-keywords, and a function for associating a keyword with a production rule. For instance, the function for determining if a character is a keyword symbol may be implemented as follows. A character c is provided as the input parameter to the function. Then, the function returns the value TRUE if c is a keyword in the language, otherwise it returns the value FALSE. A similar implementation may be given for the function that determines if a symbol is a non-keyword in the language. TABLE B illustrates the functions for identifying keywords, non-keywords and for associating a keyword with a production rule, in the C programming language for the exemplary language described in the previous section.

TABLE B

```
 1. Boolean IsKeyw (c)
 2. char     c;
 3. {
 4. return (  c =='+' || c =='-' );
 5. }
 6. SymbolKind   GetKeywKind (c)
 7. char          c;
 8. {
 9. switch (c){
10.          case '+':
11.                return ( addop )'
12.          case '-':
13.                return ( divline );
14.          default:
15.              DebugStr("\pGetKeywKind: unknown symbol");
16.        }
17.
18. }
19.   Boolen IsNonKeyw(c)
20 char c;
21. {
22. return(('0' <= c && c <= '9')||('a' <= c && c <= 'z')
23.                         ||'A' <= c && c <= 'Z'));
24. }
```

A first function IsKEYW, lines 1–5, receives a character and determines whether it is a keyword defined within the language. In this instance the set of keywords are the symbols +, –.

A second function GetKeywKind, lines 6–18, evaluates a provided character to determine what type of keyword it is. Such an evaluation is necessary for later identification of rules associated with the keyword. For example, lines 10–11 check for the case of a '+' character and associate a production rule called addop to the '+' character. Each of the keywords is associated with a character string that identifies a production rule. Finally, lines 14–15 provide a default error message if a non-keyword is provided as input.

A third function IsNonKeyw, lines 19–24 identifies a character as being a non-keyword. In this instance the set of non-keywords are the digits "0" through "9", the characters "a" through "z", and the characters "A" through "Z".

Table C illustrates the definition of a production rule. In this case, the production rule is associated with the '+' keyword. Here it is presumed that the keyword symbol '+' will have been associated to the character string "addop" in the manner described above.

TABLE C

```
 1. rule = NewObject (ruleKind, "\psexpression", &r);
 2. AddRule (rule, rules, addop, sexpression, UNDEFINED,
 3.         UNDEFINED);
 4. symbol = NewObject (symbKind, "\paddop", & r);
 5. AddSymbolToRule (symbol, rule, addop, UNDEFINED,
    UNDEFINED, 6.
    UNDEFINED, 1);
 7. symbol = NewObject (symbKind, "\psexpression", &r)'
 8. AddSymbolToRule (symbol, rule, sexpression, cWEST,
    WEST, 0, 2);
 9. symbol = NewObject (symbKind, "\pterm", &r);
10. AddSymbolToRule (symbol, rule, term, cEAST, EAST,
    0, 3);
```

There are two primary functions that are used in the definition of a production rule; AddRule and AddSymbolToRule. The AddRule function is the means by which a rule is added to a set of rules. The AddRule function has the following syntactic:

AddRule (r, R, k, lhs, $a_1$, $a_2$)

where r is the rule being processed, R is a set of rules for the grammar, k is the keyword, lhs is the left hand side symbol and $a_1$ and 2 are actions that may be taken when the rule is matched.

The AddSymbolToRule function is the means by which a symbol is added to the rule. In this instance a symbol is either a keyword, non-keyword or nonterminal. The AddSymbolToRule function has the following syntactic:

AddSymbolToRule (s, r, n, c, d, q, m)

where s is the symbol, r is the rule being processed, n is the symbol name, c is the name of the constraint function associated with the symbol, d is the name of the display procedure for the symbol, if the rule has a keyword, q is equal the keyword symbol number, if the rule does not have a keyword, q is set to −1, and m is the symbol number for the symbol being processed. It is important to note that there will typically be a plurality of symbols associated with a rule.

Referring to Table C, using the rule grammar notation described above, a rule of the following form is created:

Sexpression→addop Sexpression Term

Note that the Sexpression symbol on the left hand side of the rule was defined by the AddRule function while the addop, Sexpression and Term symbols on the fight hand side of the rule were defined by the AddsymbolToRule function.

Referring to lines 2–3 of TABLE C, the AddRule function defines the addop keyword to be associated with the rule and a left hand side symbol Sexpression. Here the notations UNDEFINED indicate that there is no action that would be taken upon the matching of this rule.

Referring to lines 4–6 of TABLE C, the AddSymbolToRule function defines keyword symbol addop on the fight hand side of the rule. The keyword symbol addop has no spatial constraints and has been assigned the symbol number 1.

Referring to lines 7–8 of TABLE C, the AddSymbolToRule function defines the symbol Sexpression on the fight hand side of the rule with a constraint that it be to the west of the symbol number 1, i.e. the addop keyword symbol. This symbol has been assigned the symbol number 2.

Referring to lines 9–10 or TABLE C, the AddSymbolToRule function defines the symbol Term on the fight hand side of the rule with a constraint that it be to the east of the symbol number 1, i.e. the addop keyword symbol. This symbol has been assigned the symbol number 3.

With regards to the spatial constraints included in the production rules, comparisons are made based on bounding rectangles associated with each symbol (as defined by the semantic pan of the rule). Such a constraint is illustrated in TABLE D.

TABLE D

```
1.  Boolean  cEAST (dist, r1, r2)
2.  int      *dist;
3.  Rect     *r1;
4.  Rect     *r2;
5.  {
6.  int      midx, midy;
    Boolean  east;
8.  if (RectHeight (*r1) < RectHeight (*r2)){
9.       midx = (r1->right + r1->left)>>1;
10.      midy = (r1->top + r1->bottom)>>1;
11.      east = (r2->top<=midy) && (midy<=r2->bottom)
12.                && (midx <= r2->right);
13.      *dist = r2->right - midx;
14. }
15. else {
16.      midx = (r2->right + r2->left) >> 1;
17.      midy = (r2->top + r2->bottom) >> 1;
18.      east = (r1->top <= midy) &&
         (midy <= r1->bottom)
19.                && (r1->right <= midx);
20.      *dist = midx - r1->right;
21. }
21. return (east)
22. }
```

TABLE D illustrates a C-Language implementation for an "East" of constraint. The function returns two values; a Boolean value indicating whether or not a second rectangle (i.e. r2) is to the east of a first rectangle (i.e. r1), and the east-oriented distance between the two rectangles. If the second rectangle (r2) is not to the east of the first rectangle (r1), an invalid distance is returned. It should be noted that the Y-coordinate increases from top to bottom and the X-coordinate increases from left to right.

The flow of operation for the cEAST constraint is similar to that used for all constraints in this language. Processing is first premised on which rectangle has a greater height. Line 8 of Table D is a conditional statement which dictates processing control. If the height of r1 is less than r2, then the midpoints of r1 are determined (lines 9–10). A true value is returned, i.e. r2 is east of r1, if the Y-coordinate of the upper left point of r2 is less than or equal to the midpoint Y-coordinate of r1 and the midpoint Y-coordinate is less than or equal to the Y-coordinate of the lower right point of r2 and the X-coordinate of the lower right point of r2 is less than or equal to the X-coordinate of the midpoint of r1 (see lines 11–12). Otherwise, a false value is returned. The distance returned is the value resulting when subtracting the X-coordinate of the midpoint of r1 from the X-coordinate of the lower right point of r2 (see line 13).

If the height of r1 is greater than or equal to the height of r2, then the midpoint of r2 is determined (lines 16–17). A true value is returned, i.e. r1 is east of r2, if the Y-coordinate of the upper left point of r1 is less than or equal to the midpoint Y-coordinate of r2 and the midpoint Y-coordinate is less than or equal to the Y-coordinate of the lower right point of r1 and the X-coordinate of the lower right point of r1 is less than or equal to the X-coordinate of the midpoint of r2 (see lines 18–19). Otherwise, a false value is returned. The distance returned is the value resulting when subtracting the X-coordinate of the midpoint of r2 and the X-coordinate of the lower right point of r2 (see line 20).

Parsing Method of the Preferred Embodiment

The parsing method of the preferred embodiment produces a parsed tree from a set of input subpatterns and a constrained attribute grammar, if the input subpatterns constitute a valid pattern as defined by the grammar. If the input does not define a pattern in the language, the parsing method returns an error message. In the present implementation, one of the flags of the unit is "REJECTED", and this flag is set in the unit if the parsing method detects an error. The method of the preferred embodiment utilizes recursive programming techniques. It should be noted that the parsing method of the preferred embodiment uses heuristics to limit the parsing process. In the description of the method of the preferred embodiment, a means for backtracking is provided. Such a backtracking means would be useful in situations where after attempting to parse a rule further parsing is not possible. Using such backtracking means, all possible meaningful parsable combination could be derived. However, given the limited computational and memory resources of smaller computer systems, such as pen-based computer systems, this backtracking means may be omitted.

Figure 9A:
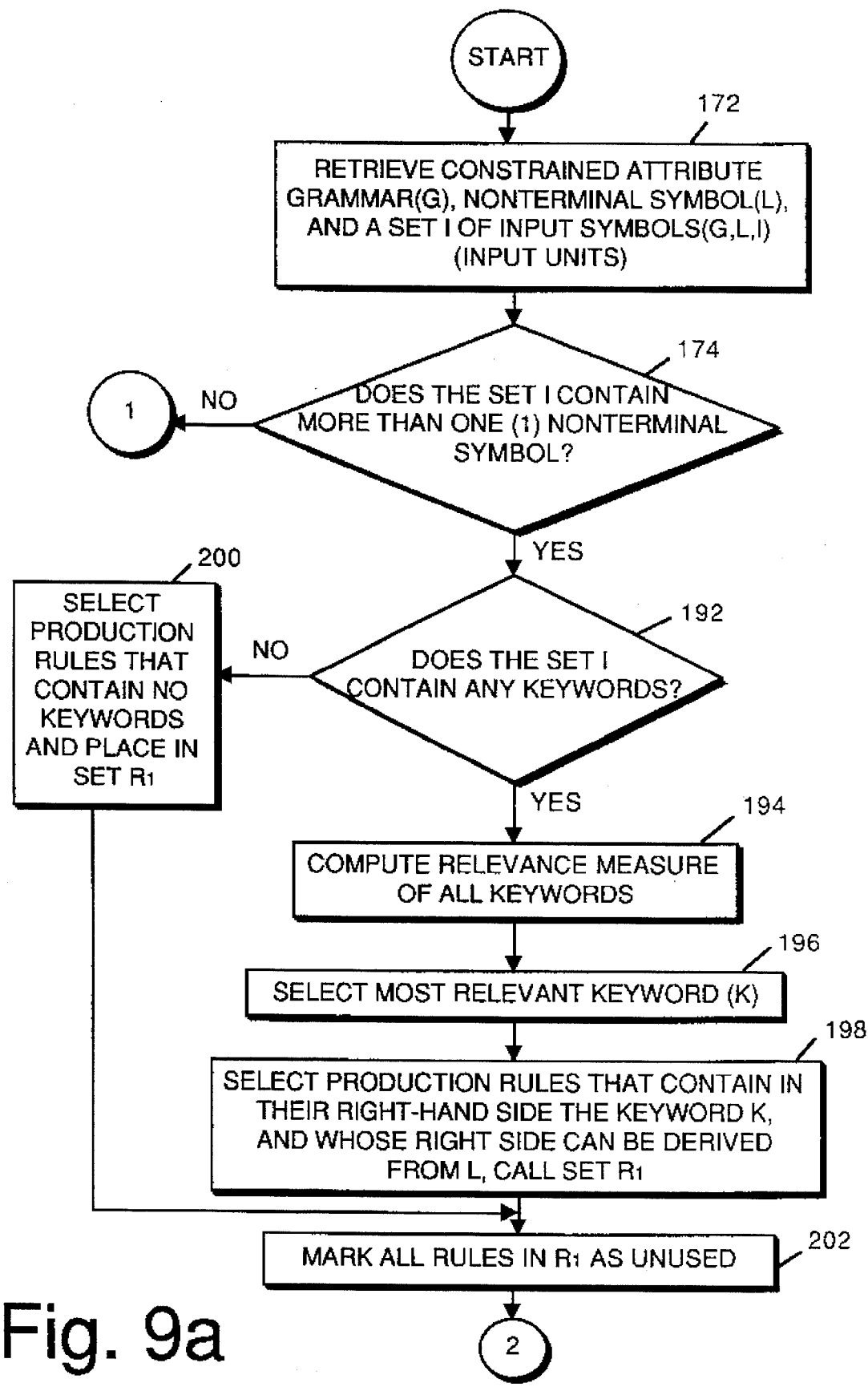
FIGS. 9a, 9b, 9c, and 9d comprise a flow diagram of the parsing process of the present invention.

The parsing method of the preferred embodiment is illustrated in FIGS. 9a–9d. Referring to FIG. 9a, the method of the preferred embodiment has as input parameters an instance of a constrained attribute grammar ("rules") G, a nonterminal symbol L, and a non-empty set (one or more) of input symbols (e.g. units) I, step 172. The set I is modified during the processing of the method. The parsing method is implemented as a function which returns a "success" value if the elements in the set of input symbols I can be rewritten as the nonterminal symbol L using the grammar G. If not, the function returns "failure". For the initial call the symbol L is the start symbol S and I is the initial set of input symbols (i.e. the subpatterns) received from a character recognition system. Notation used for the invocation of the function will be Parse (G, L, I). Recursive invocations will typically provide different values of L and I. So the notation for the first call of the function will be Parse (G, S, I).

Figure 9B:
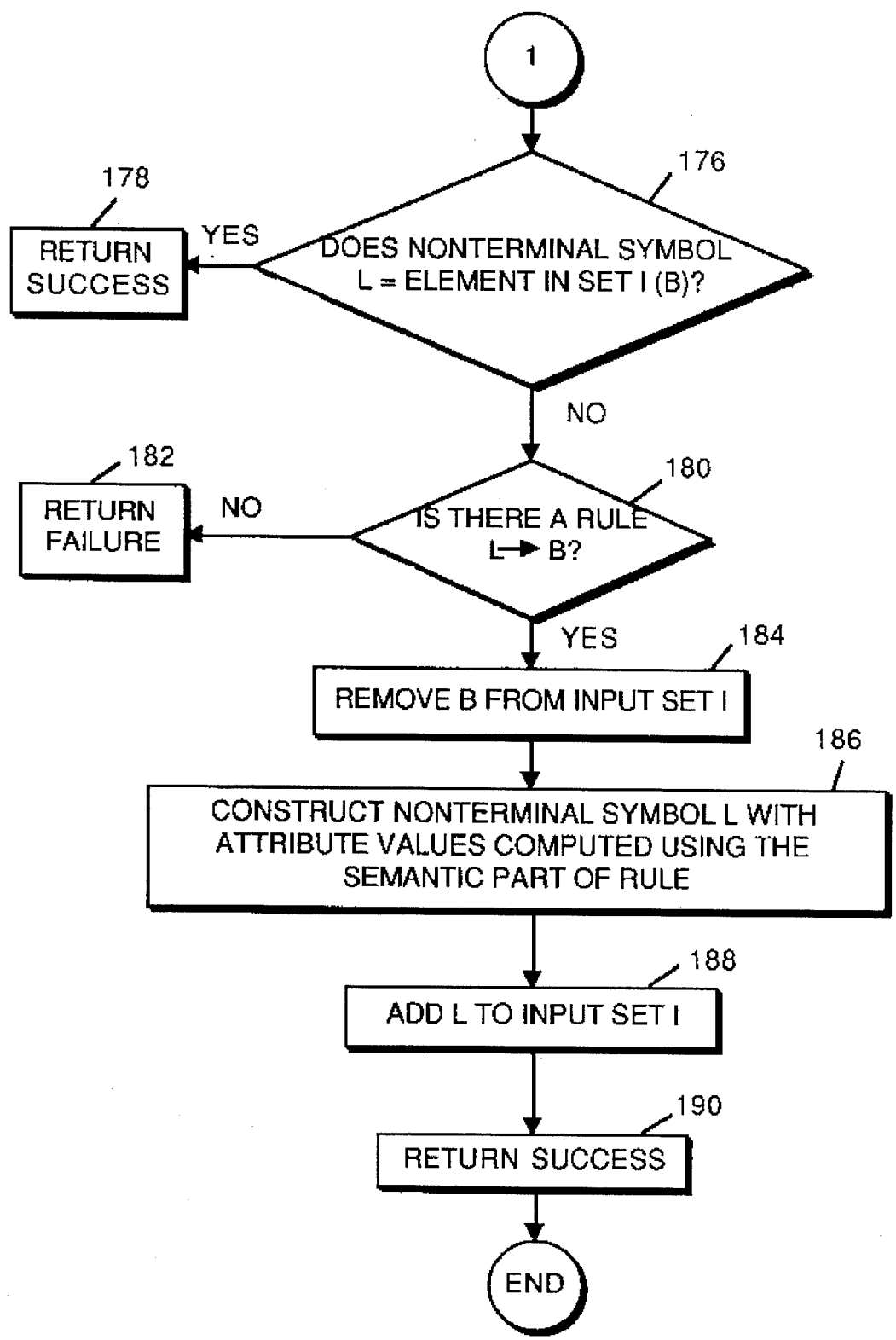

It must then be determined if the set I contains more than one element, step 174. Referring now to FIG. 9b, if the set I contains one element symbol, then one of three cases arise. First, it is determined if the symbol L has the same type as the element in the input set I, step 176. If they have the same type, a success value is returned, step 178. If L does not have the same syntactic kind as the element in the input set I, L must be a nonterminal symbol. It is then determined if there is a production rule such that the nonterminal symbol produces the element in input set I, step 180. This is accomplished by examining the syntactic portion of the production rules to locate the element in the input set I as being on the right hand side of the rule and the nonterminal symbol as being on the left hand side of the rule. If no production rule produces the element, the method returns a "failure" value, step 182. This means that an invalid subpattern has been found in the pattern and thus the pattern is not valid according to the language. If such a production rule does exist, the nonterminal symbol is removed from the set I, step 184. Next, an intermediate nonterminal symbol labeled L is created with values computed using the production rule identified in step 180, step 186. The nonterminal symbol L is then added to the set I, step 188. A "success" value for the invocation of the function is then returned., step 190. It should be noted that the steps 176–190 check for valid subpatterns.

Referring back to FIG. 9a, if them is more than one element in the input set I, then it must be determined which symbol in the input set I is to be processed. It is first determined if the input set I contains any keywords, step 192. If yes, the relevance measure M of each keyword in the input set I is computed, step 194. Next, the most relevant keyword, i.e. the keyword with the highest relevance measure, is selected, step 196. Production rules which contain the keyword. K in their right hand side and whose left hand side can be derived from L are collected in a set called $R_1$, step 198. All the production rules in $R_1$ am then marked as unused, step 202.

Alternatively, if the set I does not contain any keywords, the set of production rules that do not contain any keywords and whose left hand side can be derived from L is placed in set $R_1$, step 200. Again, all the production rules in $R_1$ would then be marked as unused per step 202.

Figure 9C:
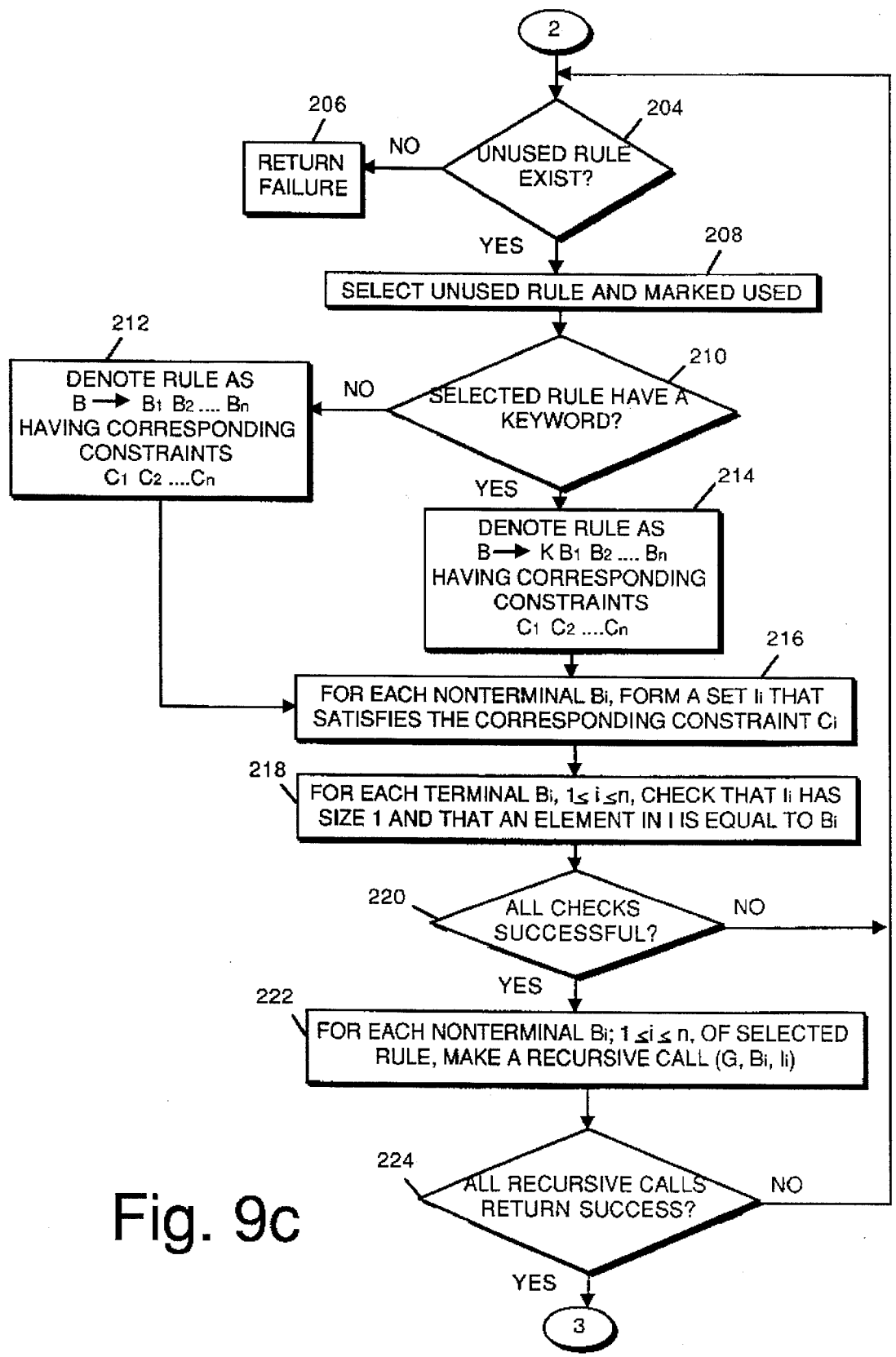

Referring now to FIG. 9c, it is then determined if there is an unused production rule, step 204. If no unused rule exists, return a failure value, step 206. If an unused rule exists in $R_1$, select an unused rule and mark it as used, step 208. It is then determined if the selected rule has a keyword, step 210. If the selected rule does not have a keyword, the rule has the form $B \rightarrow B_1 B_2 \ldots B_n$ and the symbols have the corresponding constraints $C_1 C_2 \ldots C_n$, step 212. Otherwise, the rule has the form $B \rightarrow K B_2 \ldots B_n$ and the symbols have the corresponding constraints $C_1 C_2 \ldots C_n$, step 214.

For each symbol $B_i$ of the selected rule form a set $I_i$ of elements in I that satisfy the constraint $C_i$ of the identified rule, step 216. For each terminal symbol $B_i$, if the set $I_i$ contains a single element and the type of the element is equal to $B_i$ then mark the match "success, step 198". Otherwise mark the match "failure". If not all the matches are successful, i.e. one of the matches is marked with the "failure" value then a check for an unused rule is made per step 204 and the method continues as described above.

If every terminal symbol in the rule has a successful match, a recursive call is then made for each nonterminal symbol $B_i$, step 222 (e.g. Parse $(G, B_i, I_i)$). The result of each call is then determined, step 224. If not all the calls are successful, i.e. one of the recursive calls returns a "failure" value then a check for an unused rule is made per step 204 and the method continues as described above.

Figure 9D:
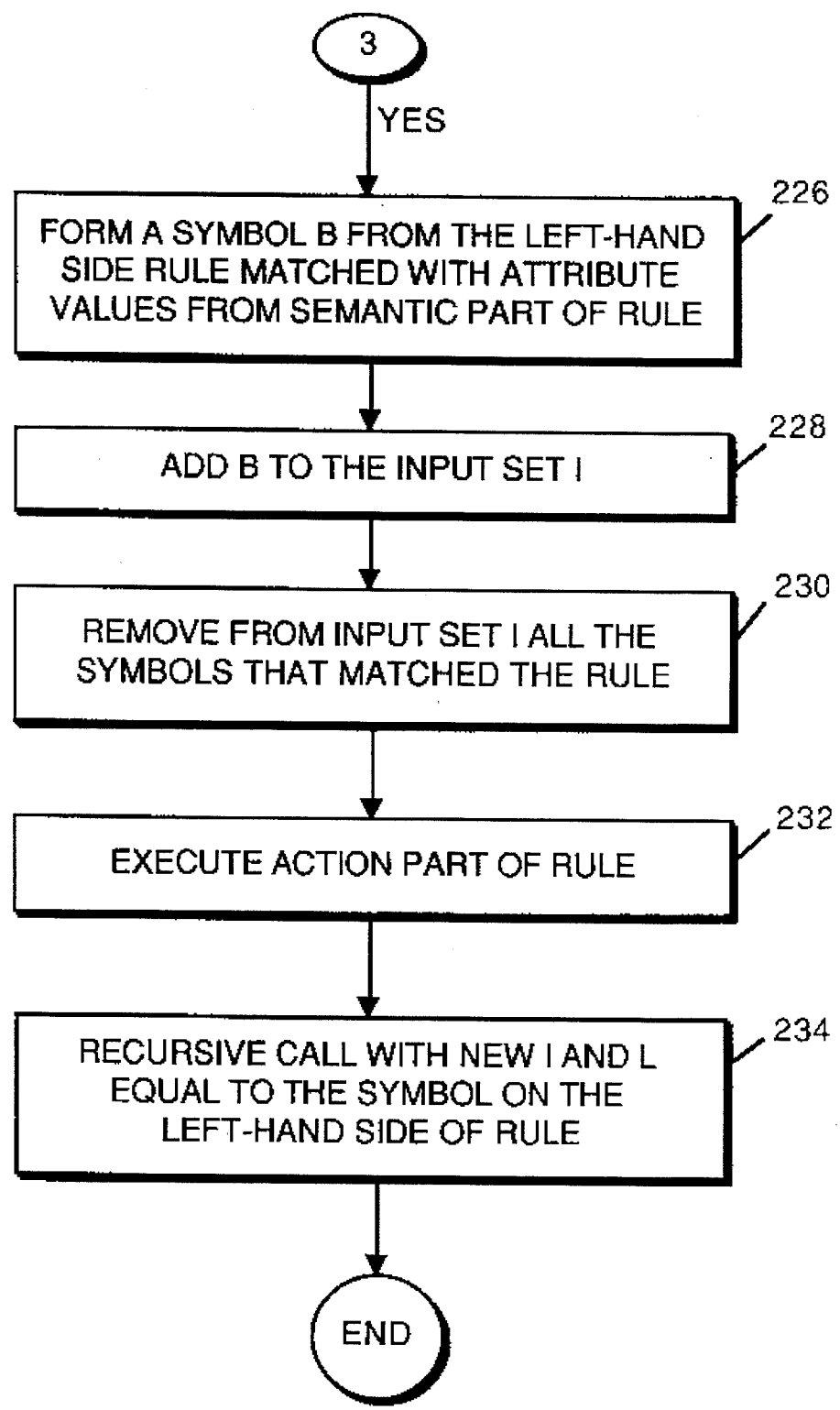

Referring now to FIG. 9d, if all the recursive calls do return "success" then a new nonterminal symbol B is created from the left hand side of the syntactic part of the production rule used and the attribute values are provided from the semantic part of the production rule, step 226. The new nonterminal symbol B is then added to the input set I, step 228. Next, all the symbols that matched the rule are removed from the input set I, step 230. The action part, if any, associated with the rule is then executed, step 232. Finally, a recursive call with the modified input set I and the symbol L (e.g. Parse G, S, I), step 234.

In order for the initial call to the Parser function to return a "success" value, all invocations of the Parser function must have returned a "success" value. If at any point a "failure" value is returned, the value of the initial call will be "failure".

It should be noted that the Parsing method of the preferred embodiment is general in nature. It can equally well apply to the columns recognition domain, calcs recognition domain, or other recognition domains (not specified.) depending upon the set of rules (e.g. constrained attribute grammar). Namely, there are no restrictions on the existence of keywords in the rules. Further it should be noted that the provision of error messages has not been described. It would be apparent to one skilled in the art to return error messages at points in the method where a failure value is returned.

Parsing Example

Operation of the parsing method of the preferred embodiment is described in greater detail with respect to the example of the mathematical language described above. Consider the following equation:

¾+1

The output of the character recognition processes would provide the initial input set (+,−,3, 4, 1). In an initial call, the nonterminal symbol is the starting symbol S and the input set. Thus, the grammar G=Mathematical Expressions Example, L=the start symbol S and I=(+,−,3, 4, 1). Using the notation described above, the initial call would be Parse (G, S, I). It should be noted that each number in the set I is a terminal symbol (nk). However, for clarity in the exposition, we refer to the numbers instead of referring to their type.

Since the initial input set has more than one element, it is determined if any keywords exist in input set I. The keywords "+" and "−" exist in the input set I. Relevance measures for each keyword are then computed. The relevance measure for each is M(+)=32 and M(−)=60. Thus, the most relevant keyword is "−" (division symbol). Upon examining the production rules for the keyword "−", it is found that only one such rule exists. The production rule for the keyword "−" is given below.

The symbol x in the constraint part of the rule denotes a nonterminal or a terminal symbol, while the symbol k denotes a keyword symbol.

$$E \longrightarrow -E_1E_2 \quad A(E) = A(-) \cup A(E_1) \cup A(E_2)$$
$$C_0(x) = Eq(x, -),$$
$$\text{and } M(x) \geq M(k).$$
$$C_1(x) = North(x, -).$$
$$C_2(x) = South(x, -).$$

The rule is then placed in a set $R_1$, marked unused, selected and marked as used. A subset of symbols from I, which satisfies the corresponding constraints, is created for each of the nonterminal symbols $E_1$ and $E_2$. These subsets are called $I_1$ and $I_2$, respectively. The subset $I_1$ ={3} since the non-keyword 3 satisfies $C_1$ and the subset $I_2$={4} since the non-keyword 4 satisfies $C_2$. Recursive calls are then made with symbols $E_1$ and $E_2$ and their corresponding subsets, i.e. Parse (G, $E_1$, $I_1$) and Parse (G, $E_2$, $I_2$).

Evaluating the recursive call Parse (G, $E_1$, $I_1$), it is determined that the input set only contains one element, i.e. (3). The nonterminal symbol $E_1$ does not have the same type as the element in $I_1$, but a production rule which produces the element is rule 4 $E_1 \rightarrow$Elnk (recall that the number 3 is an non-keyword). Thus, the element in the input set $I_1$ can be replaced by the nonterminal symbol $E_1$. Note that the semantic part of rule 4 provides that $A(E_1)=A(3)$. The element 3 is removed from the input set $I_1$ while the intermediate symbol $E_1$, used in the recursive call, is added to the set. Hence, $I_1=\{E_1\}$. This invocation of the function then returns a "success" value.

Evaluating the recursive call Parse (G, $E_2$, $I_2$), it is determined that the input set only contains one element, i.e. (4). The nonterminal symbol $E_2$ does not have the same type as the element in $I_2$, but a production rule which produces the element is rule 5 $E_2 \rightarrow$Elnk (recall that the number 4 is an non-keyword). Thus, the input set $I_2$ can be rewritten as the nonterminal symbol $E_2$. Note that the semantic part of rule 5 provides that $A(E_2)=A(4)$. Thus, the element 4 is removed from the input set $I_2$ while the intermediate symbol $E_2$, used in the recursive call, is added to the set. Hence, $I_2=\{E_2\}$. This invocation of the function then returns a "success" value.

As both recursively called functions have returned "success", a new nonterminal symbol E is created and added to the input set I. E is from the left hand side of the syntactic part of rule 3. Further, the attribute value for the nonterminal E is derived from the semantic part of the rule. So $A(E) = A(-) \cup A(3) \cup A(4)$. The symbols matched in the rule are removed from the input set I, and the left hand side nonterminal symbol is added so that $I = (E, +, 1)$. Effectively, the subpattern $$\frac{3}{4}$$

has been rewritten as E. There is no action part in this rule. A recursive call Parse (G, S, I) is then made.

During this recursive call, there is again more than one element in the input set, and the keyword "+" is the most relevant (and only) keyword. Upon examining the production rules for the keyword "+" it is found that only one such keyword exists. The production rule for the "+" keyword is given below. The symbol x in the constraint part of the rule denotes a nonterminal or a terminal symbol, while the symbol k denotes a keyword symbol.

$$E \longrightarrow +E_1E_2 \quad A(E) = A(+) \cup A(E1) \cup A(E2)$$
$$C_0(x) = Eq(x, +)$$
$$\text{and } M(x) \geq M(k).$$
$$C_1(x) = West(x, +).$$
$$C_2(x) = East(x, +).$$

The rule is then inserted into set $R_1$, marked unused, selected and marked as used. As was done above, a subset of symbols from I, which satisfies the corresponding constraints, is created for each of the symbols $E_1$ and $E_2$. These subsets are called $I_1$ and $I_2$, respectively. The subset $I_1 = \{E\}$ since the nonterminal E satisfies $C_1$ and the subset $I_2 = \{1\}$ since the non-keyword 1 satisfies $C_2$. Recursive calls are then made with symbols $E_1$ and $E_2$ and their corresponding subsets, i.e. Parse (G, $E_1$, $I_1$) and Parse (G, $E_2$, $I_2$).

Evaluating the recursive call Parse (G, $E_1$, $I_1$), it is determined that the input set only contains one element, i.e. (E). The nonterminal symbol $E_1$ does not have the same type as E but a production rule which produces the element is rule 4 $E_1 \rightarrow E|nk$. Thus, the element in the set $I_1$ is replaced by the nonterminal symbol $E_1$. Note that the semantic part of rule 4 provides that $A(E_1) = A(E)$. Thus, the element E is removed from the input set $I_1$ and the intermediate symbol $E_1$, used in the recursive call, is added to the set. Hence, $I_1 = \{E_1\}$. The function then returns a "success" value.

Evaluating the recursive call Parse (G, $E_2$, $I_2$), it is determined that the input set only contains one element, i.e. (1). The nonterminal symbol $E_2$ does not have the same type as 1 but a production rule which produces the element is rule 5 $E_2 \rightarrow E|nk$ (recall that the number 1 is a non-keyword). Thus, the input set $I_2$ can be rewritten as the nonterminal symbol $E_2$. Note that the semantic part of the rule 5 provides that $A(E_2) = A(1)$. Thus, the element 1 is removed from the input set $I_2$ and is replaced with intermediate symbol $E_2$ used in the recursive call. Hence, $I_2 = \{E_2\}$. The recursively called function then returns "success".

As both recursively called functions have returned "success", a new nonterminal symbol E is created and added to the input set I. E is from the left hand side of the "+" keyword syntactic rule 2. The symbols matched in the rule, including the "old" E, are removed from the input set I, so that $I = (E)$. Further, the attribute value for the nonterminal E is derived from the semantic part of the rule. So $A(E) = A(1) \cup A(\text{"old" } E) \cup A(1)$. Here the expression E+1 has been rewritten as E. The rule has no action part. Another recursive call Parse (G, S, I) is then made.

In this recursive call, there is only one element in the input set I, namely E. This nonterminal is not equal to S but a production rule which produces the element is rule 1 $S \rightarrow E|nk$. Thus, the element in the set I is replaced by the nonterminal symbol S. Note that the semantic part of the rule 1 provides that $A(S) = A(E)$. This recursive invocation of the function then returns a "success" value.

The returned "success" values then propagate back-up so that the initial invocation provides a success value so that the input set I is re-written as the start symbol S and the pattern is deemed valid.

Figure 10:
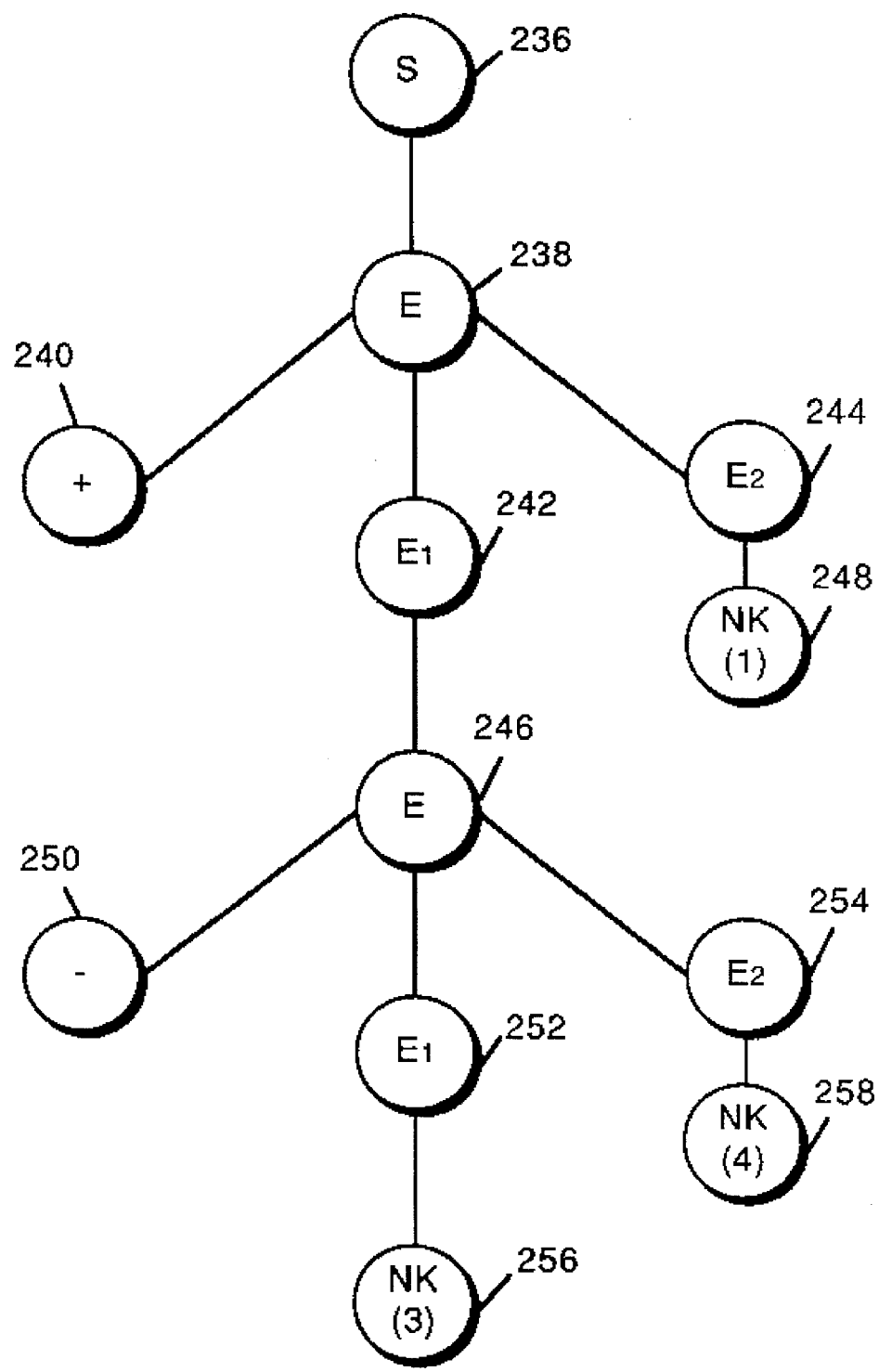
FIG. 10 is a parsed tree produced by the parsing process of FIGS. 9a–9d.

The tree structure that is generated as a result of the parsing is illustrated in FIG. 10. In FIG. 10, the start symbol 236 is the root node. A nonterminal symbol E 238 corresponds to the Parsing of the "+" keyword. The nonterminal E 238 is further broken down into component nonterminal $E_1$ 242, $E_2$ 244 and the "+" keyword 240. The nonterminals 242 and 244 are further parsed into nonterminal E 246 and non-keyword "1" 248, respectively. The nonterminals E 506 is Parsed into the "−" keyword 250 and nonterminals $E_1$ 252 and $E_2$ 254. Finally, non-keyword "3" 256 corresponds to nonterminal $E_1$ 252 and non-keyword "4" 258 corresponds to nonterminal $E_2$ 254.

The parsed tree illustrated in FIG. 10 can be evaluated by techniques well known to those skilled in the art to provide a result to the equation, as was explained above. This result is preferably displayed on screen 42 proximate to the equation that was used to create the parsed tree. More specifically, the result is preferably displayed on the screen on the other side of an equals ("=") sign separating the result from the equation.

Figure 11:
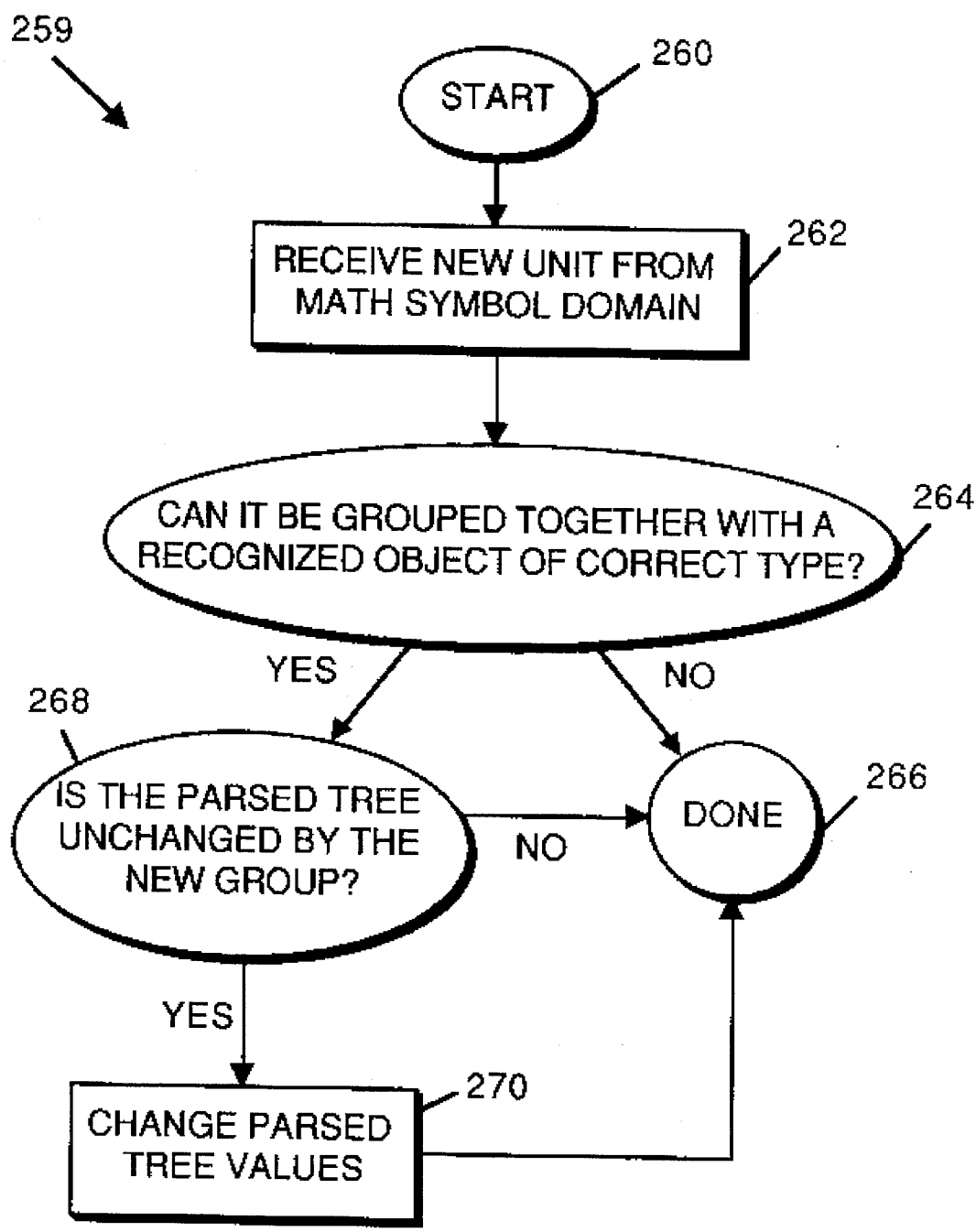
FIG. 11 is a flow diagram of a parsed tree editor of the present invention.

The grouping portion of the procedures for the columns recognition domain 94 and the calcs recognition domain 96 preferably includes an "editing" process 259, as illustrated in FIG. 11. The editing process permits an equation represented by a parsed tree (such as the parsed tree illustrated in FIG. 10) to be modified in certain ways without reparsing the equation. The process 259 begins at 260 and, in a step 262, a new MATH SYMBOL unit is received from the MATH SYMBOL domain. Next, in a decision step 264, it is determined whether the new unit can be grouped together With a recognized object of the correct type. For example, if the new unit comprised a digit, it can be grouped together with a proximate digit, but if the new unit comprised a graphical object, such as a pentagon, it could not be grouped with an equation object, i.e. it is of the wrong type. If the new unit cannot be grouped, the editing portion of the grouping process is completed as indicated in step 266. If the new unit is of a correct type, a decision step 268 determines whether the parsed tree for the recognized object would remain structurally unchanged by the addition of the new unit. If the addition of the new unit would change the structure of the parsed tree of the recognized object, the new unit is not added to the recognized object. If the new unit can be added to the recognized object without changing the structure of the parsed tree, then the new unit is added to the recognized object in a step 270 and the editing portion of the grouping process is completed at step 266.

The equation editing process 259 will be further explained in terms of several examples with reference to FIGS. 12a–12c and 13a–13c. In FIG. 12a, an equation 272 is recognized as described previously and a parsed tree 273 (see FIG. 13a) is formed. The parsed tree 273 is solved, and a result 274 is provided by the system, as described previously.

In FIG. 12b, the numeral 3 has been placed in front of the numeral 3 of the equation 272 to form a new equation 276.

Figure 13A:
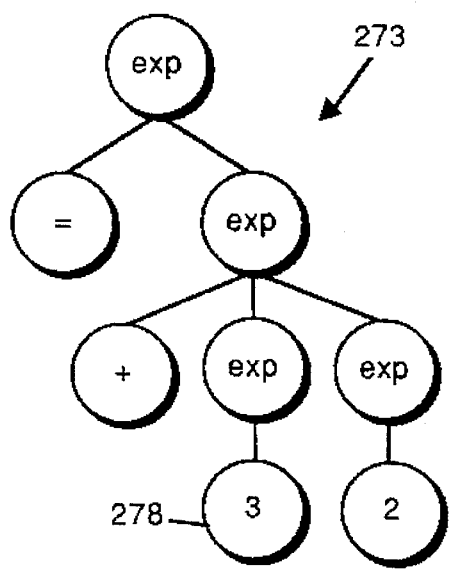
FIGS. 13a, 13b, and 13c illustrate the parsed trees created for the equations of FIGS. 12a, 12b, and 12c, respectively.
Figure 13B:
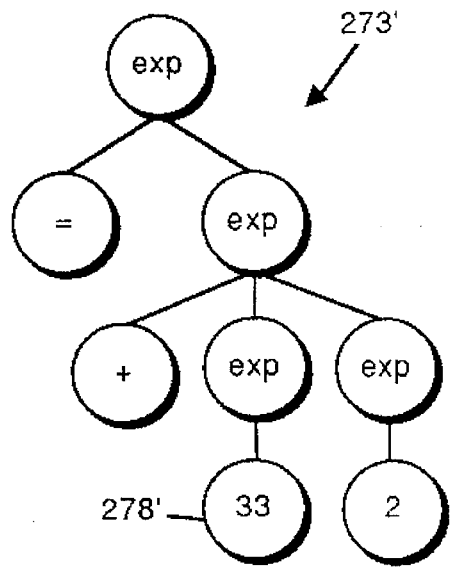
Figure 13C:
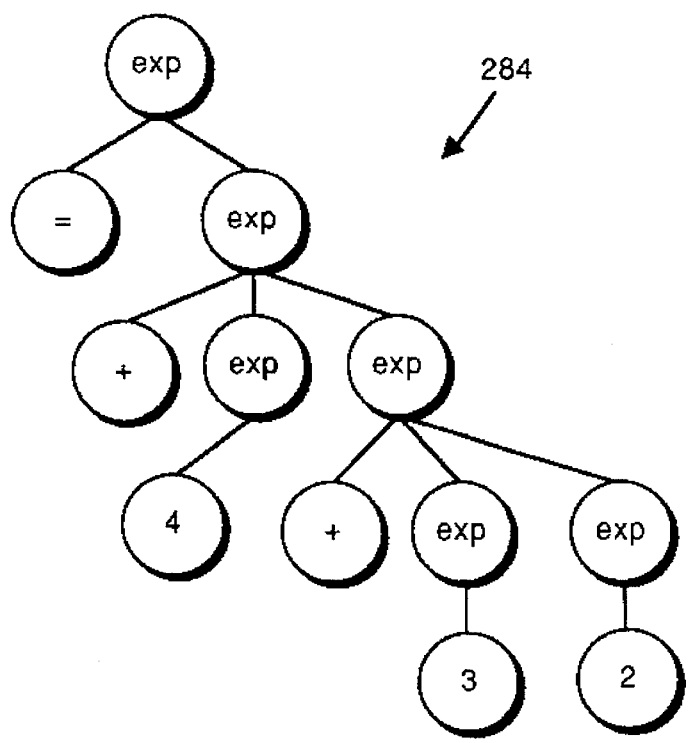

The system recognizes that the parsed tree structure is not changed by substituting a "33" for a "3" and, therefore, the equation does not have to be recognized and parsed. Instead, the parsed tree 272 of FIG. 13a is "edited" by replacing the "3" value 278 with a "33" value 278', resulting in the edited parsed tree 273' of FIG. 13b. The parsed tree is then re-evaluated to return a new result 280 as seen in FIG. 12b. It is therefore apparent that the parsed tree editing function embodied in the process 259 of FIG. 11 can save a great deal of needless computation when a user edits an equation in such a manner that the structure of its parsed tree is not is not changed.

In FIG. 12c, a user has edited the equation 272 of FIG. 12a with the addition of the term "4+" to create a new equation 282. This type of edit will result in the need to reparse the entire edited equation 282 to create a new parsed tree 284 (see FIG. 13c).

In the present implementation of step 268 of FIG. 11, a parsed tree is considered to be unchanged if an operand is substituted for another operand or if one operator is substituted for another operator. In those instances, the recognition of the new equation and the parsing of the new equation is not required. The addition or removal of terms from an equation requires the equation to be re-recognized and re-parsed into a new parsed tree for that altered equation.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for processing handwritten equations on a computer system comprising the steps of:

receiving an input pattern comprising an equation which was derived from user handwritten strokes on a graphical user input device;

parsing said input pattern utilizing a defined constrained attribute grammar to determine if said input pattern defines a valid pattern within said constrained attribute grammar, said valid pattern including a set of subpatterns satisfying constraints of production rules included in said constrained attribute grammar, said constraints being used by said parsing step to establish correspondence between said subpatterns and said production rules, said constraints including keywords to be identified within said subpatterns;

providing a parsed tree from said step of parsing said input pattern when said input pattern is determined to be a valid pattern in said parsing step;

deriving and displaying said equation and a result of said equation utilizing said parsed tree by executing an operator at nodes of said parsed tree using operands included in said parsed tree, wherein said receiving, parsing, providing, and deriving steps are performed on said computer system;

detecting an edit made to said displayed equation having said result; and editing said parsed tree associated with said equation in response to said edit made to said displayed equation and without changing a structure of said parsed tree when said edit changes only a value or an operator of said equation.

2. A method as recited in claim 1 wherein said graphical user input device comprises a tablet means.

3. A method as recited in claim 2 wherein said tablet means comprises a touch sensitive screen assembly.

4. A method as recited in claim 3 further comprising the step of displaying said result on said screen assembly.

5. A method as recited in claim 1 wherein said input pattern includes a plurality of stroke units which were derived from said user input strokes on said graphical user input device.

6. A method as recited in claim 1 wherein said step of parsing said input pattern comprises:

a) identifying a subpattern of said input pattern that can be rewritten as a nonterminal symbol of a grammar of a predefined language;

b) rewriting said subpattern as said nonterminal symbol; and c) determining if one of said production rules of said grammar exists where a start symbol of said grammar produces said nonterminal symbol, wherein said production rule includes a syntactic part, a semantic part, a constraints part including said constraints, and an action part.

7. A method as recited in claim 6 wherein said nonterminal symbol comprises at least one of said keywords and identifiers, and wherein said step of identifying a subpattern further comprises the steps of:

a) determining that a subpattern in said pattern matches one of said keywords;

b) identifying one of said production rules that corresponds to said keyword;

c) identifying said subpattern that satisfies a first constraint of said production rule, said first constraint having a corresponding nonterminal symbol N;

d) determining that said subpattern contains only one symbol X; and e) determining that a production rule exists wherein said syntactic part and said nonterminal rule symbol N produces said symbol X.

8. A method as recited in claim 6 wherein said step of identifying a subpattern further comprises a step of determining that a subpattern in said input pattern satisfies a spatial constraint relative to a different subpattern in said input pattern.

9. A method as recited in claim 8 wherein said step of determining that a subpattern satisfies a spatial constraint includes determining that a subpattern has multi-dimensional relationships with different subpatterns.

10. A method as recited in claim 1 wherein said step of identifying a subpattern further comprises examining a relevance measure of each of said keywords to determine the relevance of said keywords and the order of keywords to be matched to said subpattern.

11. A method as recited in claim 1 wherein said editing step includes substituting a changed value or a changed operator into said structure of said parsed tree.

12. A method as recited in claim 1 further comprising deriving and displaying a result of said equation utilizing said edited parsed tree by executing an operator at nodes of said parsed tree using operands included in said parsed tree.

13. A system for processing handwritten equations comprising:

digital processing means;

screen means coupled to said digital processing means, said screen means being operative to display images in response to signals from said digital processing means and to transmit stroke signals to said digital processing means in response to the movement of a stylus means across said screen means;

equation recognition means responsive to said stroke signals and operative to detect valid equations formed on said screen means, said equation recognition means including:

means for parsing said equation to form a parsed tree, said means for parsing utilizing a constrained attribute grammar including a set of production rules, wherein said stroke signals are input to said means for parsing as a pattern including a set of subpatterns, and means for detecting whether a valid parsed tree has been formed by checking when said set of subpatterns can be rewritten as a start symbol according to said production rules and constraints included within said production rules, said constraints including keywords to be identified in said subpatterns;

equation solving means operative to provide a result for said valid equations from said valid parsed tree;

means for displaying said equation and said result on said screen proximate to said equation; and editing means for detecting an edit to said displayed equation and for editing said parsed tree in response to said edit to said displayed equation and without changing a structure of said parsed tree.

14. A system as recited in claim 13 wherein said editing means comprises:

means for detecting an edit made to an equation displayed upon said screen means having a valid parsed tree;

means for determining whether said edit changes the structure of said parsed tree; and means for editing said parsed tree if said edit does not change the structure of said parsed tree.

15. A system as recited in claim 14 wherein said means for determining comprises means for determining that the parsed tree is not changed if said edit changes only a value or an operator of said equation.

16. A system as recited in claim 15 wherein said means for editing said parsed tree comprises means for substituting a changed value or a changed operator into said structure of said parsed tree.

17. A computer system for processing handwritten equations comprising:

a) means for receiving an input pattern comprising an equation which was derived from user handwritten strokes on an input tablet;

b) a parser for parsing said input pattern, said parser including:

i) means for recognizing said input pattern as a valid pattern utilizing a defined constrained attribute grammar, said grammar including a set of production rules and a grammar start symbol, wherein said means for recognizing determines when said input pattern is valid by determining when said set of input subpatterns can be rewritten as said start symbol according to said set of production rules, wherein said production rules include a syntactic part, a semantic part, a constraints part, and an action part, said constraints part including spatial constraints that require predetermined spatial relationships be satisfied between said input subpatterns; and ii) means for providing a parsed tree when said means for recognizing recognizes said input pattern as a valid pattern;

c) data manipulation means for deriving a result of said equation utilizing said parsed tree by executing an operator at nodes of said parsed tree using operands included in said parsed tree; and d) editing means for detecting an edit to said equation and for editing said parsed tree in response to said edit to said equation and without changing a structure of said parsed tree.

18. A computer system as recited in claim 17 further comprising a display screen for displaying said result on said screen assembly and wherein said tablet comprises a touch sensitive screen assembly.

19. A computer system as recited in claim 18 wherein said production rules include constraints for identifying keywords and non-keywords within said input subpatterns and relevance measures for said keywords for matching said keywords to said input subpatterns in an order based on the relevance measures of said keywords.

20. A computer system as recited in claim 19 wherein said parser includes:

a) means for determining that one of a plurality of subpatterns in said pattern matches one of said keywords;

b) means for identifying a production rule that corresponds to said keyword;

c) means for identifying said subpattern that satisfies a first constraint of said production rule, said first constraint having a corresponding nonterminal symbol N;

d) means for determining that said subpattern contains only one symbol X; and e) means for determining that a production rule exists wherein said syntactic part of said production rule and said nonterminal symbol N produces said symbol X.

21. A computer system as recited in claim 20 wherein said editing means includes:

means for detecting an edit made to an equation displayed upon said display screen having a valid parsed tree;

means for determining whether said edit changes the structure of said parsed tree; and means for editing said parsed tree if said edit does not change the structure of said parsed tree.

22. A computer system as recited in claim 21 wherein said means for determining whether said edit changes the structure of said parsed tree comprises means for determining that the parsed tree is not changed if said edit changes only a value or an operator of said equation, and wherein said means for editing said parsed tree comprises means for substituting a changed value or a changed operator into said structure of said parsed tree.

23. A computer system as recited in claim 21 wherein said parser is included in a recognition domain, and said computer system further comprises a plurality of recognition domains, each including a parser, said recognition domains including:

a strokes recognition domain;

a word recognition domain coupled to an output of said strokes recognition domain;

a math symbols recognition domain coupled to an output of said word recognition domain; and a calculation recognition domain coupled to an output of said math symbols recognition domain.

24. A method as recited in claim 17 wherein said step of determining that one of said subpatterns satisfies a spatial constraint includes determining that one of said subpatterns has multi-dimensional relationships with different subpatterns.

* * * * *